United States Patent [19]

Udvardi-Lakos

[11] 3,999,078
[45] Dec. 21, 1976

[54] INTERRUPTION FREE INVERTER POWER SUPPLY

[75] Inventor: Janos Udvardi-Lakos, Erlangen, Germany

[73] Assignee: Siemens Aktiengesellschaft, Munich, Germany

[22] Filed: Sept. 26, 1975

[21] Appl. No.: 617,193

[30] Foreign Application Priority Data

| Oct. 10, 1974 | Germany | 2448427 |
| Sept. 27, 1974 | Germany | 2446248 |
| Sept. 27, 1974 | Germany | 2446334 |
| July 21, 1975 | Germany | 2532593 |
| Sept. 8, 1975 | Germany | 2539900 |
| Sept. 11, 1975 | Germany | 2540539 |

[52] U.S. Cl. .............................. 307/66
[51] Int. Cl.² ........................... H02J 7/00
[58] Field of Search ............... 307/66, 64, 85, 86, 307/87; 321/11, 14, 19, 20, 27 MS; 317/50

[56] References Cited

UNITED STATES PATENTS

| 3,683,198 | 8/1972 | Thode | 307/66 |
| 3,876,922 | 4/1975 | Forstbauer | 307/66 |

Primary Examiner—Herman Hohauser
Attorney, Agent, or Firm—Kenyon & Kenyon Reilly Carr & Chapin

[57] ABSTRACT

An interruption free current supply system utilizing an inverter which is maintained in the state of readiness during normal operation with its drive unit in operation and synchronized with the a.c. voltage network but with ignition pulses from the drive unit blocked so that when switching to emergency power the ignition pulses can be enabled immediately for the inverter to take over the supply of power. A filter is permanently connected ahead of the load to filter high and low frequency interference on the line voltage and during emergency power operation to filter the output voltage of the inverter, the filter further acting as means to store energy during the switching interval.

32 Claims, 13 Drawing Figures

INTERRUPTION FREE INVERTER POWER SUPPLY

BACKGROUND OF THE INVENTION

This invention relates to interruption free current supply systems in general and more particularly to an improved system of this nature.

In most known interruption free emergency power supply systems utilizing inverters the load is continuously fed through an inverter coupled to a battery which is in turn connected to a supply network through a charger and a charge transformer. In the case of failure of the supply network, the load continues to be fed from the battery through the inverter without interruption. The charger for the battery is rated so that it can deliver a full load current and can recharge the battery after a network failure. As a result the charger must be relatively large. Furthermore because of the continuous double energy conversion the efficiency of the overall emergency power supply system in normal operation is poor.

In view of these deficiencies a need for an improved system becomes evident.

SUMMARY OF THE INVENTION

The present invention solves this problem by providing an inverter which includes a regulating unit and a drive unit with means interposed between the drive unit and the controlled rectifiers of the inverter for blocking the transfer of firing pulses from the drive unit to the rectifiers during normal operation. The regulating unit and drive unit remain active during normal operation and are then simply enabled in the case of an emergency. Ahead of the load a filter is connected which is normally coupled to the a.c. network but which is coupled to the inverter during emergency network but which is coupled to the inverter during emergency operation.

In the interruption free emergency power supply system of the present invention the inverter does not operate in normal operation. The load is supplied from the a.c. voltage network through the filter. The drive unit and regulating unit of the inverter, however, do operate during normal operation. However, the transfer of firing pulses to the controlled inverter rectifiers is blocked. The permanent operation of the drive unit and of the regulating unit results in only small operating cost. Losses and noises in the power section of the inverter, which come about particularly due to transformers and chokes, do not occur during normal operation.

Upon a breakdown or an impermissible collapse of the a.c. voltage in the supply network the filter input is separated therefrom by a network switch and the inverter enabled permitting firing pulses to reach the rectifiers therein so that it may take over the load. Energy is now supplied from the battery through the inverter and the filter. The filter performs a multiple function. During normal operation it filters out high and low frequency interference on the network voltage. In emergency power operation it filters the output voltage of the inverter. Finally, during switching from normal operation to emergency operation and back to normal operation, the energy stored in the filter is used to bridge the switching intervals. A major improvement in the performance of an interruption free emergency power supply system is obtained with the system of the present invention in that the network switch is coupled through a power transformer and a semiconductor regulator to the a.c. voltage supply network. The semiconductor regulator comprises a controlled semiconductor setting means and a drive unit with a regulating device. This embodiment of the invention is particularly advantageous for use with supply networks where complete voltage failure is relatively unlikely but where prolonged voltage decreases or even voltage rises must be expected. In this case a conditioning of the network voltage can be effected with the power transformer increasing the amplitude of the network voltage and the semiconductor regulator reducing the output voltage of the power transformer through the use of a gating control or pulse control. The filter is used to filter the output voltage of the semiconductor regulator and supplies the load with a voltage which is largely free from harmonics. It thereby becomes possible to compensate fluctuations of the network voltage of up to, for example, 20% of the nominal value. As long as the voltage remains within these limits the power transformer and semiconductor regulator can maintain control and the inverter need not be connected. Instead, the inverter is used only for the emergency supply of power to the load during a severe collapse of the network voltage exceeding the regulating range of the network conditioner. The sequence of power transformer and semiconductor regulator is interchangeable in principle. When, with a design of this nature for an interruption free emergency power supply system, it is desired to switch from emergency power operation through the inverter back to normal operation, a problem arises in that the regulating device of the semiconductor regulator needs a certain amount of time to regulate the output voltage thereof to the nominal value of the load voltage. This problem can be avoided by conducting the firing pulses of the drive unit of the semiconductor through a unit which, during emergency power operation, blocks the transfer of firing pulses from the drive unit of the semiconductor regulator, and which is active even during emergency power operation, to the controlled rectifiers of the semiconductor setting means and by providing means for supplying a control voltage for the correct ignition angle of the firing pulses to the drive unit even during emergency power operation. Such can be accomplished through the use of a drive computer.

With such an embodiment the following operating procedure becomes possible:

a. During normal operation the load is fed the a.c. voltage supply network through the power transformer and preferably through the voltage regulated semiconductor regulator, the closed network switch and the filter.

b. Fluctuations in network voltage within the regulating range of the network conditioning are regulated using the power transformer in cooperation with the semiconductor regulator.

c. Upon complete failure or severe collapse of the network voltage, the filter input is separated from the network and switched to the inverter which is started by the enabling of firing pulses and controlled to deliver power to the load.

d. When the network voltage again becomes sufficient, the drive unit of the semiconductor regulator is synchronized with the voltage of the feeding network and the ignition angle for the firing pulses preset. Then inverter is stopped and disconnected from the filter input through the inverter switch. The network switch is closed and the semiconductor regulator made conductive with the preset ignition angle.

In an interruption free current supply system in which a load is fed through a filter in both normal and emergency power operation there is a problem where the load has preconnected fuses. In and the case of a defect in a load the short circuit through the filter is damped to such a great extent that fuses ahead of the load do not blow or do not blow fast enough. This can cause heavy damage in the defective load. This problem can be avoided by providing an additional switching means between the output of the filter and the load and another switching means between the supply network and the load with a monitoring device provided which, upon sensing an impermissible deviation of the load voltage and simultaneous correct network voltage, opens the switching means between the filter and the load and couples the switching means between the network and the load. Such a monitoring device detects a defect in the load or in the filter due to collapse of the load voltage during an unchanged availability of correct network voltage. The device immediately switches the load directly to the network supply so that a short circuit current with a very steep current rise can form causing the fuse ahead of the defective load to blow thereby disconnecting the defective load. This is of particular importance where a plurality of voltage sensitive loads are connected through preconnected fuses to a safe bus bar which is coupled to an a.c. voltage supply network through a filter, a semiconductor regulator and a power transformer. If a fuse connected in front of a defective load does not blow fast enough, this will result in a prolonged collapse of the bus bar voltage of the safe bus bar which in itself can cause damage in other loads; in particular it can result in interference in the program sequence of data processing systems. Herein what is meant by a safe bus bar is on which is at all times supplied with power, even should the network fail. If the monitoring device is also designed to monitor the voltage at the output of the filter it is also possible to distinguish whether a defect has occurred in one of the loads or in the power transformer, in the semiconductor regulator or in the filter. If the output voltage of the filter does not reach its nominal value despite correct availability of the network voltage, the system is designed not to switch back to operation through the filter. The load is then fed directly from the supply network until the defect in the filter, in the power transformer or in the semiconductor regulator has been corrected.

When switching back from direct network supply of the load to supply the load through the filter it is possible to have a heavy current surge on the filter at the time of connection as the energy storing filter elements are discharged. In the interruption free emergency power supply system of the present invention this can be avoided by first separating the filter from the network by operating the network switch when switching back and starting the inverter and controlling it to deliver power corresponding to the load power. The inverter is switched to the filter through the inverter switch thereby charging the filter. Once the filter is charged and the inverter delivers the load power, the load is separated from the network and connected to the filter output. The filter input is disconnected from the inverter by actuation of the inverter switch and the inverter stopped while the network switch is closed.

In such an interruption free current power supply system, switching means are required which can open and close a circuit in a very short time. Known electrical switching devices are normally designed either as rapid breakers or rapid closers. Thus, for example, the contacts of mechanical switches can be opened very rapidly using suitable release mechanisms. However, the closing of the contacts of mechanical switches takes much longer. Semiconductor switches such as thyristors, on the other hand, can be brought in conduction very rapidly by suitable actuation or the use of firing pulses. Switching off of such devices is accomplished by blocking ignition pulses. However, when alternating current is switched off it continues to flow until the next natural zero crossing. Direct current can be interrupted only by means of special quenching circuits using forced commutation.

The rapid switching means used in the interruption free current supply system of the present invention are made up of a series connection of a mechanical switch and of a semiconductor switch with a logic circuit provided which, when a switch off command is given, opens the contacts of the mechanical switch and makes the semiconductor switch nonconducting, and, which, after occurrence of a currentless or voltageless state, causes the contacts of the mechanical switch to be closed again. Then, when a command to switch on is given, the semiconductor switch is brought into conduction. Through such an arrangement the advantages of mechanical switches and of electronic semiconductor switches are utilized in a novel manner without the disadvantages of either coming into play. It should be noted that, with respect to the inverter switch, the controlled rectifiers in the inverter can take over the function of the semiconductor switch and, with the network switch, the control semiconductor regulator can be used as a semiconductor switch. As a result, the expense for additional semiconductor switches is eliminated.

DETAILED DESCRIPTION OF THE PREFERRED EMBODIMENT

Figure 1:
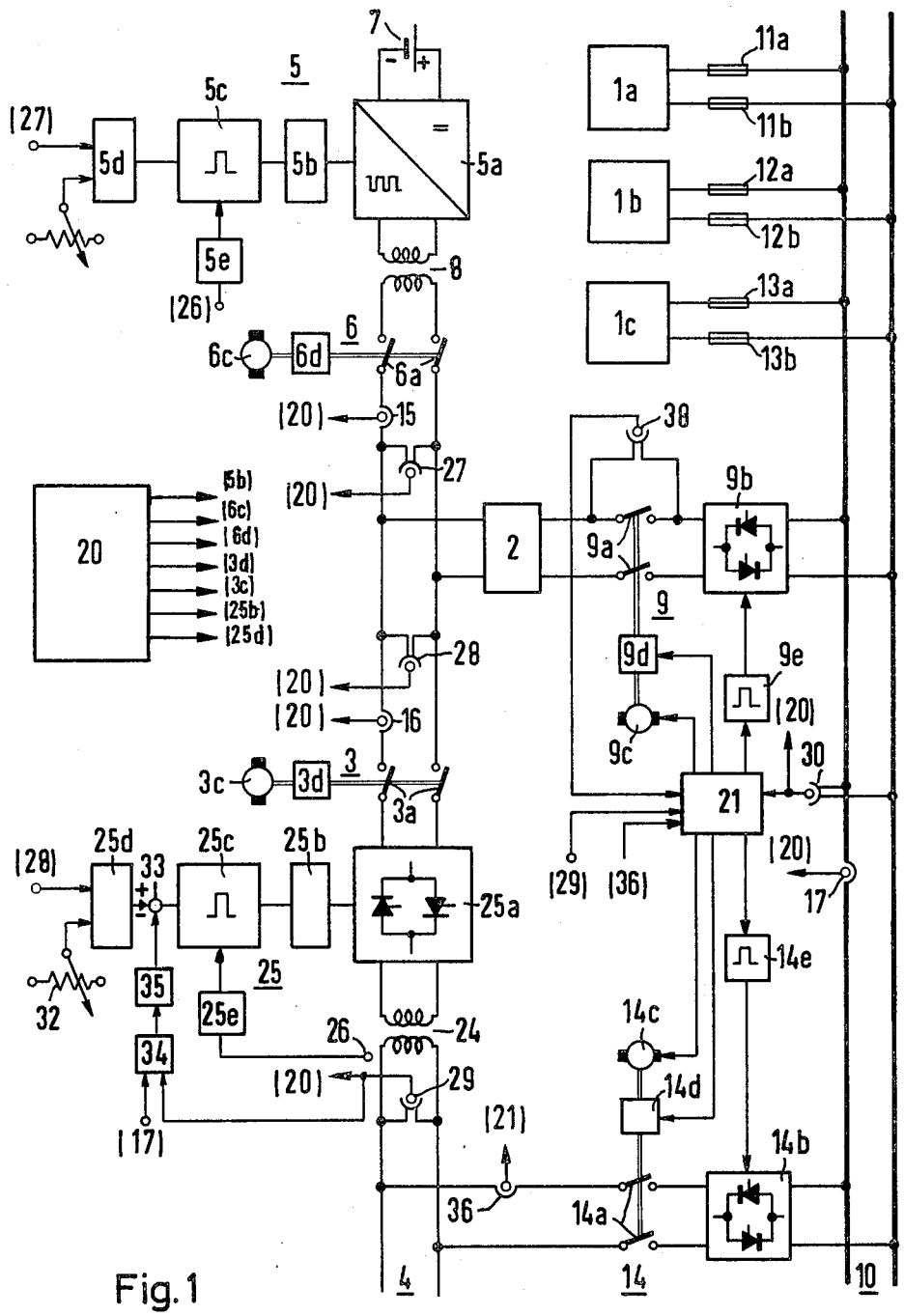
FIG. 1 is a block-circuit diagram of the interruption-free current supply system of the present invention.

FIG. 1 is a basic block diagram of an interruption free current supply system according to the present invention. Shown on the figures are plurality of loads 1a through 1c connected through fuses 11a, 11b, 12a, 12b, and 13a and 13b to a safe bus bar. The bus bar is coupled through a filter 2 by means of a switching means 9, made up of a mechanical switch and a semiconductor switch, during network operation. The filter 2 filters the high and low frequency interference in the network voltage and during emergency power operation filters the output voltage of the inverter. When switching from network operation to emergency power operation and back to network operation the energy stored in the filter bridges the switching interval. The filter 2 has its input coupled to the a.c. voltage supply network through a switching means 3, a semiconductor regulator 25 and a power transformer 24. The control electrodes of the controlled rectifiers of the semiconductor setting means 25a associated with the regulator 25 are coupled by means of an enabling stage 25b with a drive unit 25c proceeded by a regulator 25b and a synchronization monitor 25e having a synchronization tap 26.

Filter 2 also has its input coupled by means of a switching means 6 and an inverter transformer 8 to an inverter 5. The inverter 5 has a d.c. voltage source 7 connected to its d.c. voltage inputs. A chargeable storage battery may be used as the d.c. voltage source. If the inverter is to remain in operation only for short times in each case, for example, when it used in conjunction with an emergency diesel generator and must only operate until the diesel unit starts up, a capacitor may be used as the d.c. voltage source. The control electrodes of the controlled rectifiers in the power section 5a of the inverter 5 are connected by means of an enabling stage 5b to a drive unit 5c. Associated with the drive unit is a regulating device 5d and a synchronization monitor 5e which is in turn connected to the synchronization tap 26. Coupled between the a.c. voltage supply network and the safe bus bar 10 is another switching means 14 made up of the series connection of a mechanical switch and a semiconductor switch.

In addition, a current sensor 15 e.g., a current transformer for measuring the output current of the invertor 5, a current sensor 16 for measuring the current of the semiconductor regulator 25, a current sensor 17 for measuring the total load current on the safe bus bar, a voltage sensor 27 for measuring the output voltage of the inverter 5, a voltage sensor 28 for measuring the output voltage of the semiconductor regulator 25, a voltage sensor 29 for measuring the a.c. voltage of the supply network 4, and a voltage sensor 30 for measuring the bus bar voltage are provided. The values measured by these sensors are supplied to a central control device 20 which evaluates and generates commands for the individual components of the interruption free current supply system. The construction and operation of control device 20 will be explained in more detail below. An additional control device 21 is provided to control the switching means 9 and 14.

One of the most significant features of the interruption free current supply system of FIG. 1 is its excellent efficiency during normal operation. During normal operation the bus bar 10 is fed by the voltage supply network 4 by means of the closed contacts 9a and the semiconductor switch 9b, which is maintained in the conducting state, through the closed filter 2 and the closed contacts 3a of switching means 3 and the conducting semiconductor setting member 25a. The inverter is maintained in a readiness state with its drive unit 5c and its preconnected regulating means 5d already in operation and synchronized with the a.c. voltage supply network 4. The transfer of firing pulses from the drive unit 5c to the controlled rectifiers of the power section 5a of the inverter is blocked by the enabling means 5b. Upon breakdown or an impermissible collapse of the a.c. voltage supply network 4, the safe bus bar 10 is separated from the a.c. voltage supply network 4 by opening the contacts 3a of the switching means 3. The power section of 5a of the inverter 5 is started up in an extremely short time and controlled for full power delivery. During emergency power operation the inverter 5 takes over the supply of the safe bus bar having the loads 1a, 1b and 1c connected to it.

As compared with previous interruption free current supply systems in which the loads are continuously fed during normal, operation through an inverter, a battery and a battery charger, from the a.c. voltage supply network, the interruption free current supply system of the present invention has no losses during normal operation which result from double energy conversion in the battery charger and inverter. The energy consumption necessary in the interruption free current supply system of the present invention in normal operation to maintain the drive unit 5c and the regulating 5d of the inverter 5 in operation is much lower by comparison and negligible for relatively large units.

The interruption free current supply system of the present invention also offers advantages over known systems in which the inverter operates at no load in the readiness position. In such a case the controlled rectifiers of the inverter are actuated and its commutation devices continuously charged and charged reversed. In such an installation no load operation losses occur which amount to about 5% of the nominal power of the inverter.

In the interruption free current supply system of the present invention switching means for the rapid interruption and rapid connection of currents are provided. These means consist of a series connection of a mechanical switch and the semiconductor switch. When the command to switch off is given, a control device opens the contacts of the mechanical switch and renders the semiconductor switch nonconductive. After occurrence of a currentless state the contacts of the mechanical switch are again closed. Then when a switch on command is given it is only necessary that the semiconductor switch be made conductive. Thus, the load path of the switching means contains the series connection of a semiconductor switch 9b and the contact 9a of a mechanical switch. A firing pulse generator 9e is associated with the semiconductor of the switch 9b. The mechanical switch includes motor 9c for closing and a release mechanism 9d. Similarly switching means 14 include a mechanical switch with contacts 14a, motor 14c and a release mechanism 14b along with the semiconductor switch 14b and its associated firing pulse generator 14e.

The switching means 3 and 6 are constructed in similar fashion. The switching means 3 contains a mechanical switch with contacts 3a, a motor 3c and release mechanism 3d. In this switch the semiconductor regulator 25a provides the function of the semiconductor switch. The switching means 6 contains a mechanical switch with contacts 6a, a motor 6c and a release mechanism 6d. In this case the inverter 5 provides the function of the semiconductor switch.

The principle of operation of such a rapid switching device is explained in more detail with reference to FIG. 2 which shows the switching means 9 of FIG. 1 in more detail. The control electrodes of the controlled rectifiers of the semiconductor switching means are connected by means of a disabling means 9f to a firing pulse generator 9e. It is assumed that the generator runs continuously generating firing pulses. This is preferable for switching means such as 9 since it is controlled almost continuously for current conduction and becomes nonconductive only in the case of defects in one of the loads or the filter. For the switching means 14, however, which is controlled for current conduction only rarely and generally for a short time, it becomes more advantageous to start the pulse generator when a switching command is given. In such a case, a disabling stage such as the stage 9f need not be provided. However, basic operation of either switch is the same. The disabling unit 9f includes AND gates 9g and 9a which are enabled by the output of a flip flop 40. The second inputs to each of the AND gates 9g and 9h is from the pulse generator 9e. The mechanical switch includes switching contacts 9a, motor 9c and a release mechanism 9d, preferably an eddy current release coil. The release mechanism 9d is coupled through an electronic switch 41 to a capacitor 42 which is charged by a d.c. voltage source 43. A battery or rectifier may provide the d.c. voltage source. Ignition pulse generator 44 is provided to supply a firing pulse to the semiconductor 41 to cause it to become conductive. At that time the capacitor discharges through the release coil 9d to bring about a rapid opening of the contacts 9a of the mechanical switch. The closing of the contacts 9a is brought about by means of the motor 9c which, as shown can be energized by an additional d.c. source 45 in a loop including an auxiliary contact 9g and a control contact 46a. Contact 46a is associated with a relay coil 46 which, when closed, causes the mechanism 9c to run until the contacts 9a are closed and hence the auxiliary contact 9g is opened. The closing of the contact 9a takes much more time than opening.

In order that the slow closing of the contacts 9a of the mechanical switch will not delay bringing the switch into a current conducting state, the contacts 9a of the switch are closed when the switch 9 is in a currentless state. In such a currentless state the transfer of firing pulses from the pulse generator 9e to a semiconductor switching means 9b is disabled by the disabling means 9f. This causes the switch to remain off.

When a command is given to switch on, it is provided to the set input of a flip flop 45 causing that flip flop to be set enabling the gates 9g and 9h. As a result, pulses from the pulse generator 9e reach the semiconductors in the switching means 9b to result in conduction therethrough and through the closed contact 9a. A command to switch off is provided as a reset input to flip flop 40. Such a command immediately disables the gates 9g and 9h. The second output of the flip flop 40 is coupled through a pulse forming means 48 to the firing pulse generator 44 which immediately supplies a firing pulse to the semiconductpr 41 to actuate the coil of the release mechanism 9d in the manner described above. This happens very rapidly and results in the opening of the contact 9a to open the switch. The current flowing through the semiconductors in the semiconductor setting means 9b is extinguished. The second output of the flip flop 40 is also coupled through a delay line or other delay means 47 to the relay coil 46. The delay is of sufficient time to insure that the current is extinguished at the semiconductors in the semiconductor setting means 9b. At that point, the relay is operated to close the switch 46a to cause the winding mechanism 9c to reclose the contact 9a to ready the switch for turning on again.

Figure 2:
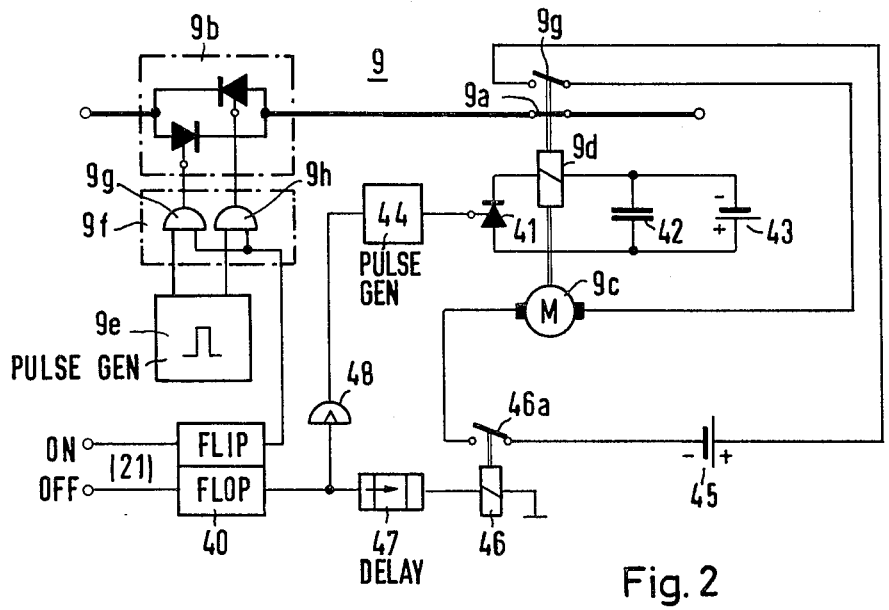
FIG. 2 is a circuit diagram illustrating the manner in which the switches used in FIG. 1 and which must be capable of fast opening and closing may be constructed.

Through the use of the rapid switching means described in FIG. 2 it becomes possible for the interruption free current supply system of FIG. 1 to carry out a quick switching from network operation to emergency power operation and back again to network operation. As noted above it is assumed that the switching means 3 is a mechanical switch and is in series with the semiconductor regulator 25 at the a.c. voltage supply network 4 and that the switching means 6 is similarily designed as a mechanical isolating switch with the control rectifiers of the inverter performing the function of the semiconductor switching member.

Figure 3:
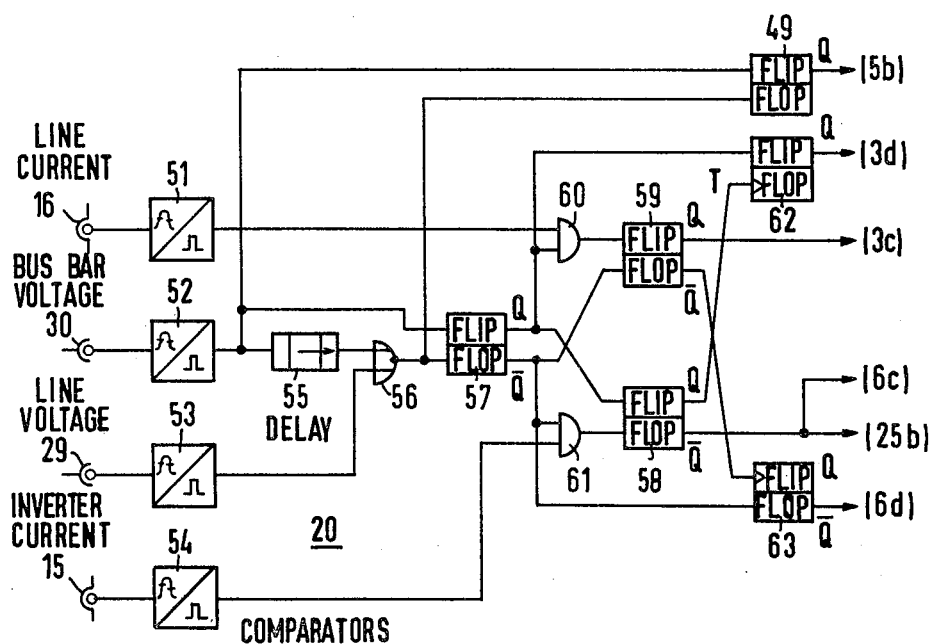
FIG. 3 is a circuit-logic diagram illustrating a control circuit for causing a switch over between normal and emergency power operation.

FIG. 3 is a schematic diagram illustrating the construction of a suitable logic circuit 20 for the control of such a switching process. At the input of the control logic 20 the current sensor 16 for sensing current through the contacts 3a, the voltage sensor 30 for measuring the bus bar voltage, the voltage sensor 29 for measuring the network voltage and the current sensor 15 for measuring the current of the inverter 5 are coupled. These respective inputs are coupled to comparators 51, 52, 53 and 54 in conventional fashion. The comparators change their output signal when their input deviates from predetermined limit values. For example, the comparator 52 maintains a logical 0 signal as long as the bus bar voltage maintains its predetermined value within permissible tolerances. However, if the bus bar deviates beyond these limits, the output of the comparator 52 changes to logical 1. Comparator 53 generates a logical 0 signal as long as the network is within prescribed tolerances but generates a logical 1 signal if the network voltage falls outside these limits. The comparators 51 and 54 change their output signals when the monitored current falls below given limit values, preferably when the monitor current becomes 0. If the bus bar voltage, as sensed by the sensor 30, deviates from its predetermined limits a logical 1 signal from the comparator 52 is immediately provided as a setting input to a memory 49, preferably a flip flop the output of which then becomes a logical 1. This output is immediately provided as an enabling input to the enabling unit 5b of the inverter 5. Now enabled, firing pulses reach the controlled rectifiers in the inverter and the inverter is started. Its output current can flow without a delay through the closed contact 6a and filter 2 into the safe bus bar 10. At the same time another flip flop 57 is set by this same output. Its Q output becomes a logical 1 and is used to set a further flip flop 58 whose Q output similarily becomes a logical 1. This output of flip flop 57 is also used as a trigger input to flip flop 62 causing it to be set and its Q output to go to a logical 1. This logical 1 output is provided to the release coil 3d of the switching means 3 causing its contacts 3a to open. The Q output of flip flop 58 will be at a logical 0 and is provided to the enabling means 25b for the firing pulses of the drive unit 25c. This unit is now disabled by the logical 0 signal and the current semiconductor setting means 25a extinguishes. As soon as the current in the semiconductor means 25a has become zero, the output of the comparator 51 changes to a logical 1. This enables AND gate 60. Since AND gate 60 had a logical 1 at its other input from the Q output of flip flop 57 its output becomes a 1 and sets the flip flop 59 whose Q output now goes to a logical 1. This output is provided to the motor 3c of the switch 3 to actuate it and close the contact 3a. The Q output of flip flop 59 went from a logical 1 to a logical 0 signal. This transition is used to set the flip flop 53. Its Q signal thus goes from a logical 1 to logical 0 signal. This does not actuate the release mechanism 60 of switching means 6. The switching operation from network operation to emergency power operation is thus carried out. Switching back to the network supply from emergency power operation takes place when the supply network 4 has regained its given value. In order that a certain period exists before such is possible the delay means 55 are provided at the output of the comparator 52 coupled to the voltage sensor 30. The output of these delay means provide one input to a NOR gate 56 which has as its other input the output of the comparator 53 obtaining its input from the sensor 29 sensing the line voltage. When the network or line voltage monitored by the sensor 29 reaches its nominal value and does not again fall below that value within the delay period of delay means 55, the output signal of the NOR gate 56 becomes a logical 1 since it has two 0 inputs. It thus resets the flip flop 57 and the flip flop 49. Resetting of the flip flop 49 causes it output to become a logical 0. As a result, the disabling means 5b are disabling to prevent further firing pulses from reaching the inverter 5a. The Q signal of the flip flop 57 becomes a logical 1 resetting flip flop 59. Its Q output is now at logical 0. However since the switch contact 3a is already closed this has no influence. The Q output of flip flop 57 provides a reset input to the flip flop 63 causing its Q output to become a logical 1. This logical 1 signal is provided to the release mechanism 6d causing the switch contact 6a to be opened. As soon as the current of the inverter 5, as sensed by the sensor 15, becomes zero, the comparator 54 provides a logical 1 signal at its output. This enables an AND gate 61. Since AND gate 61 has a logical 1 at its other input from the Q output of flip flop 57 its output becomes a logical 1 resetting flip flop 58. The Q output of flip flop 58 thus becomes a logical 1. This enables the enabling unit 25b permitting firing pulses from the drive unit 25c to reach the semiconductors of the semiconductor regulator 25. The semiconductor regulator 25 now takes over the current supply. At the same time the winding mechanism 6c of the switch 6 is actuated to close contact 6a. The Q output of flip flop 58 goes from a logical 1 to a logical 0. This transition resets flip flop 62 whose Q output now becomes a logical 0 so as to not influence the release mechanism 3d of the isolating switch 3.

The mode of operation thus far described assumes a semiconductor regulator 25 used only as a semiconductor switch. However, the regulating means 25d associated therewith make it possible, through suitable design of the power transformer 24, to obtain a conditioning of the bus bar voltage in normal operation. Thus, the safe bus bar 10 with the loads 1a, to 1c, can continue to be fed with a constant bus bar voltage even as the network voltage increases and decreases. The power transformer 24 is used to raise the amplitude of the voltage of the a.c. voltage supply network 4. Through a gating control or a pulse control the semiconductor regulator 25 reduces the effective value of the output voltage of the power transformer 24. To accomplish this, the regulator 25b has fed to it, for use as an actual value, the output voltage of the semiconductor regulator sensed by the sensor 28 or the bus bar voltage sensed by the sensor 30. In addition it has a desired value input preset to the desired value of bus bar voltage. The filter 2 filters the output voltage of the semiconductor regulator 25 and delivers a voltage for the bus bar 10 which is largely free of harmonics. Through such conditioning, fluctuations of the voltage of the a.c. voltage supply network 4 can be compensated for up to 20% of its nominal value, for example. Such voltage conditioning is particularly suitable for a.c. voltage supply networks in which complete voltage failure is relatively unlikely, but where prolonged voltage decreases or even voltage elevations must be expected. With such voltage conditioning the inverter 5 need not be started as long as the variations of the network voltage can be regulated by the power transformer 24 in conjunction with the semiconductor regulator 25. The inverter 5 is used to supply the loads only where a severe collapse or complete failure of the network voltage takes place.

The voltage increase by the power transformer 24 permits optimum adaptation of the semiconductor regulator 25 to the feeding a.c. voltage supply network 4. In addition to an adaptation of the voltage amplitude, an adaptation of the phase or the impedance of the network may be provided. For use as power transformers, auto transformers for adapting the voltage amplitude, pivoting transformers for adapting phase position of the network voltage or leakage transformers for adaptation of the network impedance or as a replacement for the commutation inductivity of the semiconductor regulator may be used. Depending on the type of feeding network, the semiconductor regulator 25 may be a three phase regulator of well known design or an a.c. regulator. In principle, it is possible to interchange the sequence of the power transformer 24 and the semiconductor regulator 25.

In order to avoid a brief voltage jump of the bus bar voltage when switching back from emergency power from the inverter to normal operation, special measures are necessary to insure that the firing pulses of the drive unit 25c for the semiconductor setting means 25a of the regulator 25 will, at the time of connection, have the correct firing angle to keep the bus bar voltage constant. The problem arises since, during emergency power operation, the output voltage of the semiconductor regulator 25 is not available as an actual value for the regulating means 25d. As a result measures must be taken to insure that a control voltage for the correct ignition angle of the firing pulses for the controlled semiconductor rectifiers of the semiconductor setting means 25a are supplied to the drive unit 25c even before switching back to the supply network 4.

FIG. 4 illustrates a first circuit for carrying out control of the semiconductor regulator 25 including means for insuring presetting of the ignition angle of the firing pulses. The controlled rectifiers used in the semiconductor setting means 25a receive their firing pulses from a drive unit 25c coupled through a disabling unit 25b. The disabling unit 25b may contain a pair of AND gates much the same as those shown in block 9f of FIG.

2 with operation taking place in similar manner. Enabling signals for these AND gates are obtained from the central control unit 20. Preferably the enabling unit 25b will be arranged between the signal section and the pulse output stage of the drive unit 25c so that signal processing can be carried out at a low power level.

The regulating means 25d of the semiconductor regulator 25 is a proportional integral controller. It includes an amplifier 25f having in its feedback path a resistor R1 and capacitor C1. In parallel across these two components is a field effect transistor switch 31. Switch 31 is controlled from the control means 20. At the input to the amplifier 25, coupled through resistors R2 and R3 respectively, are the actual value and desired value inputs. The actual value input is obtained from the voltage sensor 28 for the output of the semiconductor regulator 25 and is coupled through resistor R2. The desired value is obtained from potentiometer 32 whose output is coupled through resistor R3. Potentiometer 32 is set to a voltage corresponding to the desired output voltage. In well known fashion, as long as the switch 31 is opened, the regulator 25d will adjust its output so that its two inputs are equal. In other words it will integrate up and down until its input is zero. The output of the amplifier 25f is coupled by a resistor R4 to the input of inverting amplifier 33 having negative feedback through a resistor R5. This amplifier, which is wired as a summing amplifier, has as a second summing input through a resistor R6, the output of an amplifier 34a coupled through a function generator 35. The amplifier 34a has a feedback resistor R7 and input resistors R8 and R9. It forms what will be referred to as a drive computer 34. As a first input, through resistor R8, the output of voltage sensor 29 for the network voltage of the supply network 4 is provided and as a second input through resistor R9, the output of the current sensor 17 for the total current flowing through the bus bar. From these two input values the drive computer computes a control voltage for the drive unit 25c. This output can be connected through the function generator 35 having a characteristic selected such that all nonlinearities in a controlled interval are compensated. Such a function generator may be constructed in well known fashion as a diode function generator or the like to approximate a predetermined curve. The drive computer 34 computes a control voltage for the drive unit 25c to which is added a correction voltage having the proper sign from the regulating means 25d. In normal operation both the drive computer 34 and the regulating means 35d are in operation. The regulating means 25d, however, delivers only a correction value which will be smaller than the value calculated by the drive computer 34 which more exactly calculates the required control voltage for the drive unit 25c.

When switching to emergency power operation the electronic switch 31 is made conductive. As a result, regulating means 25d are short circuited and deliver no output voltage. Computer 34 remains in operation and continuously calculates a control voltage for the drive unit 25c. When the voltage of the supply network 4 has regained its nominal value and remained there for a given period or remains within given tolerances, switching from emergency power operation to normal power can be initiated. Computer 34 determines from the restored network voltage and current the required control voltage for the drive unit 25c. The drive unit 25c is in operation and generates firing pulses which, however, are still disabled by the disabling means 25b. When the switching order is given, the transfer of the ignition pulses from the drive unit 25c to the controlled rectifiers of the semiconductor setting member 25a is enabled by a corresponding command to the diabling means 25b. In addition, electron switch 31 is made non-conductive permitting the regulating means 25d to come into operation and deliver a correction value for the computer 34. Thus, at the time the supply network 4 is coupled in the firing pulses from the drive unit 25c have already reached an ignition angle which is largely correct. As a result, the output voltage of the semiconductor regulator 25 corresponds to its nominal value to a great extent even upon start-up. Any minor deviations are subsequently taken out by the regulating means 25e.

Figure 4A:
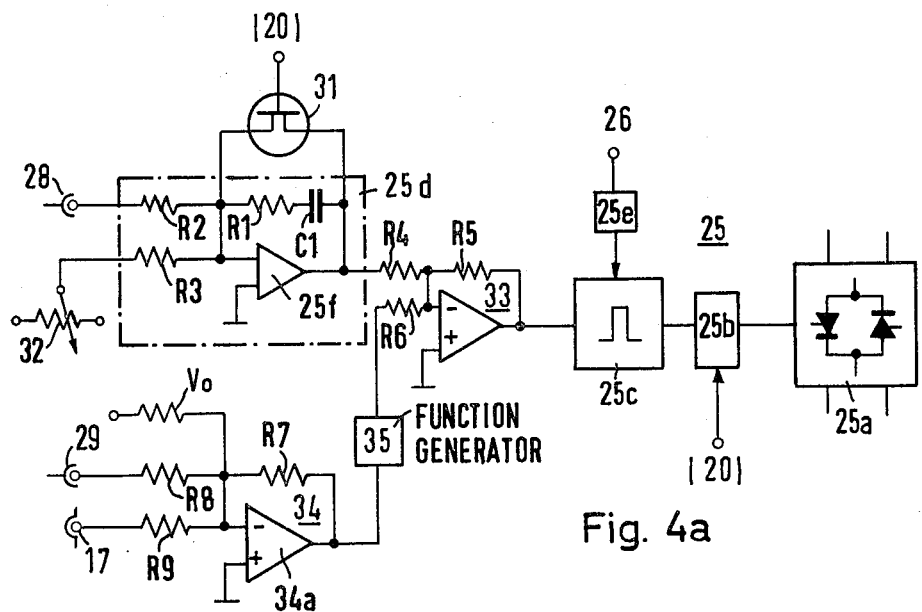
FIG. 4 is a circuit diagram of a first embodiment for controlling the semiconductor setting means of FIG. 1.
FIG. 4b is a similar diagram illustrating a second embodiment of this circuit utilizing a digital computer.

The switching arrangement of FIG. 4a allows switching back from emergency power to normal operation in a procedure in which, upon return of sufficient network voltage at the supply network 4, the drive unit 25c of the semiconductor regulator 25 and the drive unit 5c of the inverter 4 are synchronized with the returned voltage of the supply network. Furthermore, the drive unit 25c of the semiconductor regulator 25 generates ignition pulses of a preset ignition angle. After completed synchronization of the drive units 5c and 25c and presetting of the ignition angle of the firing pulses in the drive 25c, the contact 6a of the mechanical switch 6 can be opened and inverter 5 stopped. As soon as the current across contact 6a of switch 6 falls below a given value, or preferably when it becomes 0, the transfer of the ignition pulses with preset ignition angle from the drive unit 25c to the controlled rectifiers of the semiconductor setting means 25a is enabled. Current can therefore immediately flow from the supply network 4 through the power transformer 24, the semiconductor regulator 25 actuated by the firing pulses with preset ignition angle, and the closed contacts 3a of the switch 3, through the filter 2 into the bus bar 10.

Figure 4B:
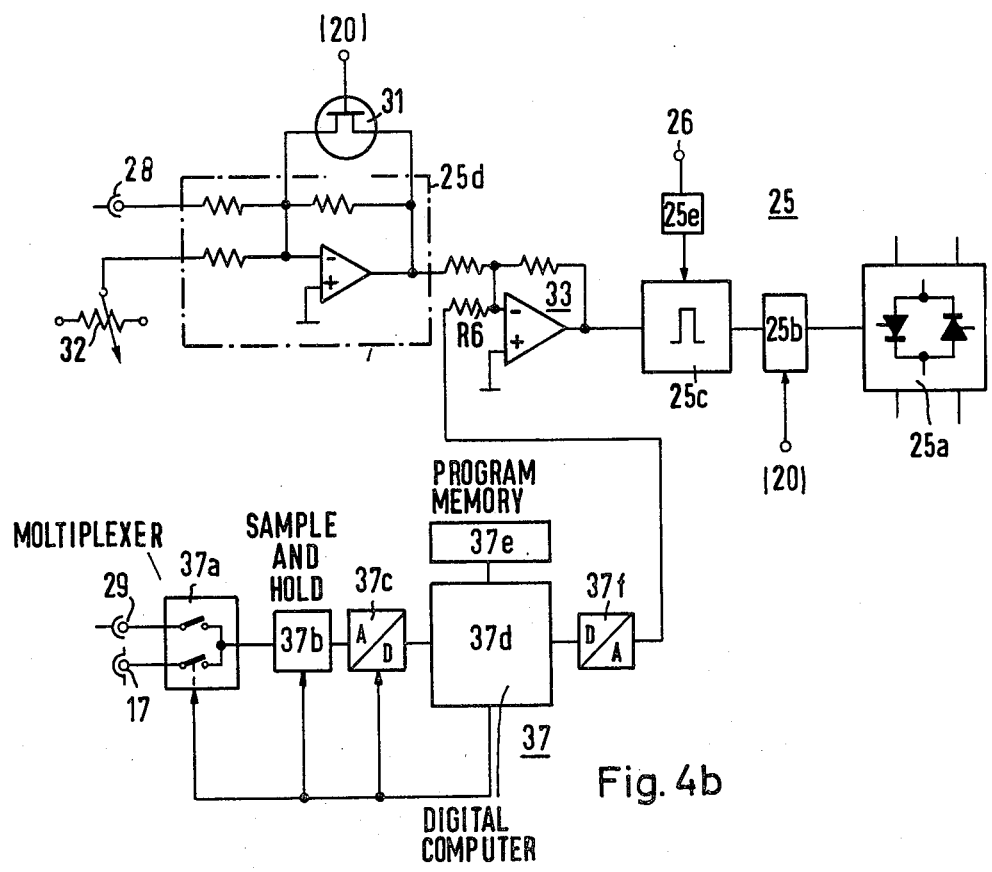

FIG. 4b illustrates a further embodiment of a drive computer 37 which is digital in nature. The remainder of the circuit of FIG. 4b is exactly as described above and will not be described again in detail. The inputs, once again from the sensors 29 and 17, are in this case provided to a multiplexer 37a. The output of the multiplexer is coupled to analog storage means 37b e.g. a sample and hold circuit, which has its output coupled to a digital to analog converter 37c. The digitized values of voltage and current are provided by analog to digital converter 37c to a digital computer 37d having an associated program memory 37e. Preferably this will be a micro processor. The output of the computer 37d is converted back to an analog value in a digital to analog converter 37f the output of which is provided through resistor R6 to the amplifier 33. The digital computer is programmed to take the values of network voltage and current on the bus bar 10 and compute therefrom a digital value for the necessary ignition angle. The computer also provides clock signals to the multiplexer 37a, sample and hold circuit 37b and analog to digital converter 37c in conventional fashion. The use of the digital computer 37b permits replacing the drive computer 34 and function generator 35 of FIG. 4a with the computer program taking to account all non-linearities in the controlled interval.

It should also be noted that during normal operation it is possible for the inverter 5 to preset the ignition angle of the firing pulses of its drive unit 5c in similar manner. Instead of a measured value for the network voltage, a measured value for the battery voltage is supplied to a corresponding drive computer. Preferably this value is a value of battery voltage which is load current related. In addition the enabling stage 5b can also be comprised of AND gates which are enabled and disabled by a signal from the control means 20. The enabling means 5b can most expediently be arranged between the signal section and the pulse output stages of the drive unit 5c in order to be able to carry out the signal processing at a low power level. In the interruption-free current supply system of the present invention the filter 2 is arranged so that it filters both the output voltage of the inverter 5 and the output voltage of the semiconductor regulator 25. Because of this arrangement of the filter 2, it is possible that should there be a defect in one of the loads 1a–1c, the rise of the short circuit current across the filter 2 will be damped to the extent that the fuses ahead of the defective load will not blow or will not blow fast enough. This can cause damage in the defective load. If the fuses ahead of the load do not blow fast enough there may be a prolonged collapse of the bus bar voltage on the safe bus bar 10. Such prolonged collapse of the bus bar voltage can cause damage in the other loads, in particular it can have a very bad effect causing disturbances in the program sequence in data processing systems.

In order to insure a fast and reliable response of the fuses preceding the load, the interruption-free current supply system of the present invention is provided with switching means 9 between filter 2 and bus bar 10 and additional switching means 14 between the a–c voltage supply network bus bar 4. If a defect occurs in one of the loads 1a–1c, for example a short circuited load 1a, the bus bar voltage picked up by the sensor 30 will drop without the existance of a simultaneous disturbance of the network voltage. This is the established criteria that one of the loads is defective or that there is a disturbance in filter 2, in the semiconductor regulator or in the power transformer 24. The contacts 9a of the switching means 9 are now opened at once and the additional switching means 14 brought into conduction. The bus bar 10 is connected directly to the a.c. voltage supply network 4. If in fact there was a short circuit in the load, a short circuit current with a very steep current rise forms and blows the fuses 11a and 11b ahead of the defective load 1a thereby disconnecting it. If the defect was in one of the loads and not in the filter 2, the semiconductor regulator 25 or the power transformer 24, the bus bar voltage subsequently returns to its nominal value and it is possible to switch back to normal network feeding through the power transformer 24, the semiconductor regulator 25 and filter 2. However, if there is a defect in the power transformer 24 or the semiconductor regulator 25, bus bar 10 will continue to be fed directly from the a.c. voltage supply network through the switching means 14, the inverter 5 being started if necessary should the network breakdown. In the case of a defect in filter 2, bus bar 10 remains connected to the a.c. voltage supply network 4 through the switching means 14 until the defect is eliminated. In such a case reliable current supply of a load is no longer insured should breakdown of the network voltage occur. However, calculations have shown that simultaneous defects in the filter 2 and breakdown of the network voltage is extremely improbable.

When switching back from the direct network feeding through switching means 14 to normal operation through the power transformer 24, semiconductor regulator 25 and filter 2, it is necessary to take care that an excessive current surge is not caused when switching back to the discharged filter 2. For this purpose, the switching can be brought about in the following manner:

For direct feeding from the supply network 4 to bus bar 10, the switching contacts 14 are closed and the semiconductor switch 14b of switching device 14 made conductive to connect the bus bar 10 through the closed switching contacts 14 and directly with the a.c. voltage supply network 4. Inverter 5 is in the readiness position and not in operation. When switching back the semiconductor regulator 25 is first actuated in conjunction with the regulating means 25d, control means 20 control the semiconductor regulator 25 so that the voltage across the contact 9a of the switching means 9 in the filter output becomes 0. Now the contacts 9a are closed and immediately thereafter, by proper actuation of the semiconductor regulator 25 using its drive unit 25c and regulating means 25d, the current strength in filter 2 is brought to the value of current consumption in the bus bar 10. Contacts 14a of the switch means 14 are opened by actuating of the release mechanism 14d and the setting means 14b of the switching means 14 made non-conductive as soon as its current has become 0 or at least so small that when the switching means 14 is disabled there occur no impermissibly high current surges on filter 2.

Figure 5:
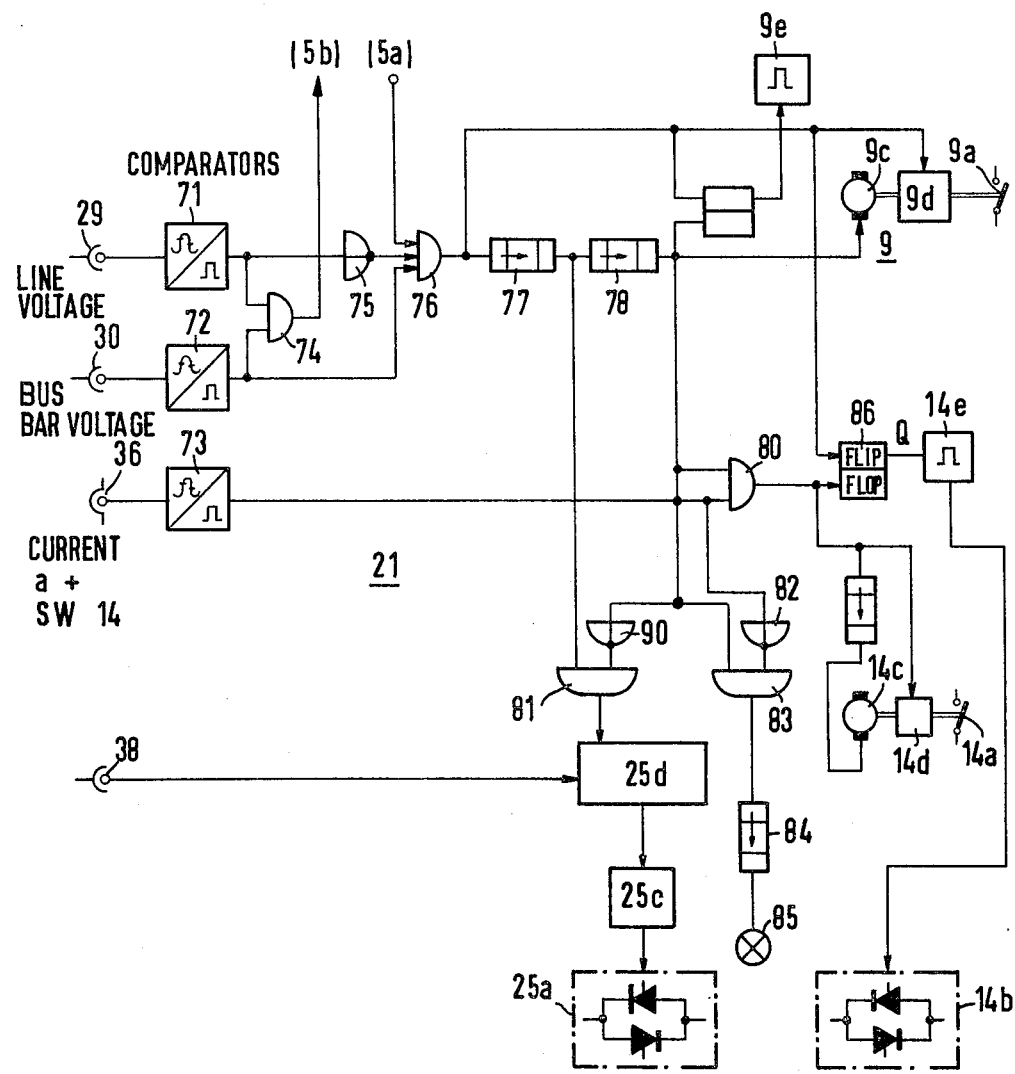
FIG. 5 is a circuit-logic diagram illustrating a circuit for bypassing the transformer semiconductor setting means and filter of FIG. 1 in the case of a short circuit.

FIG. 5 is a schematic-logic diagram illustrating a circuit 21 for carrying out such operation. The control means 21 has at its inputs three comparators 71, 72 and 73. These are coupled respectively to the sensor 29 sensing the voltage of the a–c supply network 4, sensor 30 sensing the bus bar voltage and current sensor 36 sensing the current through the switching means 14. Comparator 71 generates a logical 1 signal if the network voltage deviates beyond a preset value. Comparator 72 generates a logical 1 signal if the bus bar voltage deviates beyond predetermined limits. The third comparator 73 generates a logical 1 signal when the current through the switching 14 as sensed by current sensor 36 falls below a predetermined value which is established to be a value at which the contacts 14a can be opened without an impermissible current surge occuring on the filter. The outputs of the comparators 71 and 72 are inputs to an AND gate 74. If a collapse of the network voltage and simultaneous collapse of the bus bar voltage occur, the output signal of AND gate 74 appears. This indicates a defect in the network voltage and thus this signal is used to enable the enabling means 5b associated with the inverter 5 so that the inverter is started and assumes the emergency power supply of the bus bar 10 in the manner described above. The output of the comparator 71 having the line voltage at its input is also inverted through an inverter 75 and provided as an input to an additional AND gate 76. AND gate 76 has a second input from comparator 72 associated with the bus bar voltage and a third input from the inverter 5 which is a logical 1 when the inverter is not in operation. Thus, should the network voltage be correct but the bus bar voltage disturbed, the output of the comparator 72 will become a logical 1. The output of the comparator 71 will remain at a logical 0 which when inverted through the inverter 75 will appear as a logical 1 at AND gate 76. If the inverter is not in operation a further logical 1 signal will be provided and the output of gate 76 will also become a logical 1. The output signal from AND gate 76 operates the release mechanism 9d of the switch 9 causing its contact 9a to open. The output of AND gate 76 also sets a flipflop 86 causing its Q output to become a logical 1 starting a pulse generator 14e which immediately closes the switch 14b. As a result, the switch 14 is now closed. The output of AND gate 76 is also an input to a delay means 77 which has its output coupled through another delay means 78. The output the delay means 77 is one input to an AND gate 81. AND gate 81 has its second input from an inverter 80 having its input coupled to the output of the delay means 78 which initially will still be at a logical 0. AND gate 81 thus provides a logical 1 output to the regulating unit 25d to cause it to carry out a voltage regulation through the drive unit 25c which will cause the voltage across contacts 9a of the switching means 9 to become 0. The delay time of the delay means 78 is of a duration to permit this voltage to become 0. Rather than using delay means 78 a logic connection with a corresponding repeat signal could be provided. The output of the delay means 78 is coupled to the motor 9c of the switch 9 causing it to close the contact 9a. In addition, it disables the AND gate 81 through the inverter 80 and has an input for switching the regulating unit 25d of the the semiconductor regulator 25 to normal load regulation. In response to this input from the voltage sensor 38 voltage regulation is blocked. The regulating unit 25d controls the semiconductor regulator 25 through its drive unit 25c to full load assumption. Feeding of the bus bar 10 through the switching means 14 is succeeded by feeding through the semiconductor regulator 25. If the current in the switching means falls below the value preset in the comparator 73, the comparator's output becomes a logical 1. This provides a second input to an AND gate 80 which obtains its other input from the output of the delay means 78. This resets flipflop 86 causing its Q output to go to a logical 0 disabling the pulse generator 14e for the semiconductor switch 14b. This signal also actuates the release mechanism 14d opening the switch contacts 14a. In the manner described above, after a delay, the contact 14a is again closed by the motor 14c.

The mechanical switch in n the switching means 14 would, in principle, not be necessary since the current can be coupled in and out through the switching means 14 simply through proper control of the semiconductor switch 14b. However, the mechanical switch proves useful for maintenance work. In addition, a simpler wiring of the semiconductor switch 14b can be used. It is also advantageous to be able to carry out a rapid and well defined current interruption in the switching means 14.

Similarly, the semiconductor switch 9b is not necessary in principle. It may be either permanently actuated or made conductive or non-conductive together with the actuation of the release mechanism 90 or of the motor 9c. The semiconductor switch 9b may, however, take over functions in connection with protective measures.

Also illustrated on FIG. 5 is an indicator 85. If a defect is present and the current does not fall below the value set in the comparator 73 at the end of the period established by the delay 78, i.e. the time provided for the voltage across the contacts 9a to be brought to zero, the logical 0 output of the comparator 73, inverted through an inverter 82 enables an AND gate 83 the output of which is provided through a delay 84 to indicate 85. This gives an indication of a fault. Similar means for indicating can be provided in appropriately modified form for the other signals developed within the control means.

Another manner of insuring rapid and reliable response of the fuses is to continuously monitor the network voltage and bus bar voltage for deviations beyond pre-established limit as shown in connection with FIG. 5. If there is a deviation outside limits of the bus bar voltage and at the same time the network is within its tolerance values, the filter output is again separated by the switching means 9 from the bus bar 10 and the latter connected by a switching means 14 directly to the a.c. voltage supply network 4. A short current circuit with a very steep current rise can now build up causing the fuses in front of the defective load to blow as fast as necessary. The voltage collapse at the bus bar lasts only an extremely short time during which the other loads are not disturbed. As soon as the faulty load is separated from the bus bar 10 because of the blown fuses, the bus bar voltage regains is nominal value. Now switching back to current supply through power transformer 24, semiconductor regulator 25 and filter 2 can be carried out in several successive steps. First, filter 2 is separated at its input from the a-c voltage supply network 4 by opening contacts 3a of the switching means 3 and possibly by disabling the semiconductor regulator 25. Inverter 5 is controlled for voltage delivery and switched by means of contact 6a of the switching means 6 to the input of filter 2. It remains there until the energy accumulators, i.e. choke coils, capacitors, etc., in filter 2 are charged. Only then is the output of filter 2 again switched to the bus bar 10 by closing the contacts 9a and actuation of the semiconductor switch 9b of the switching means 9. The energy supply of the bus bar 10 now occurs simultaneously in parallel from the network 4 through the switching means 14 and from the inverter 5 through the filter 2. Inverter 5 is controlled for power delivery. As soon as inverter 5 has taken over the full load power, switching means 14 is made non-conductive thereby separating bus bar 10 from the network 4. This state of operation corresponds to emergency power operation from which it is possible, in the manner described above, to switch back to feeding through the power transformer 24 and the semiconductor regulator 25. By closing the contacts 3a of the switching means and a corresponding actuation of the semiconductor regulator 25, with firing pulses preferably preset to the proper ignition angle, the energy supply of the bus bar 10 is again from the a.c. voltage supply network 4 through the power transformer 24, the semiconductor regulator 25 and the filter 2. The inverter 5 is then stopped and brought into readiness operation. This type of switching back also insure that an impermissable current stage on the filter is avoided. As noted above, such could ocur if the discharge filter were connected without taking these measures.

Figure 6:
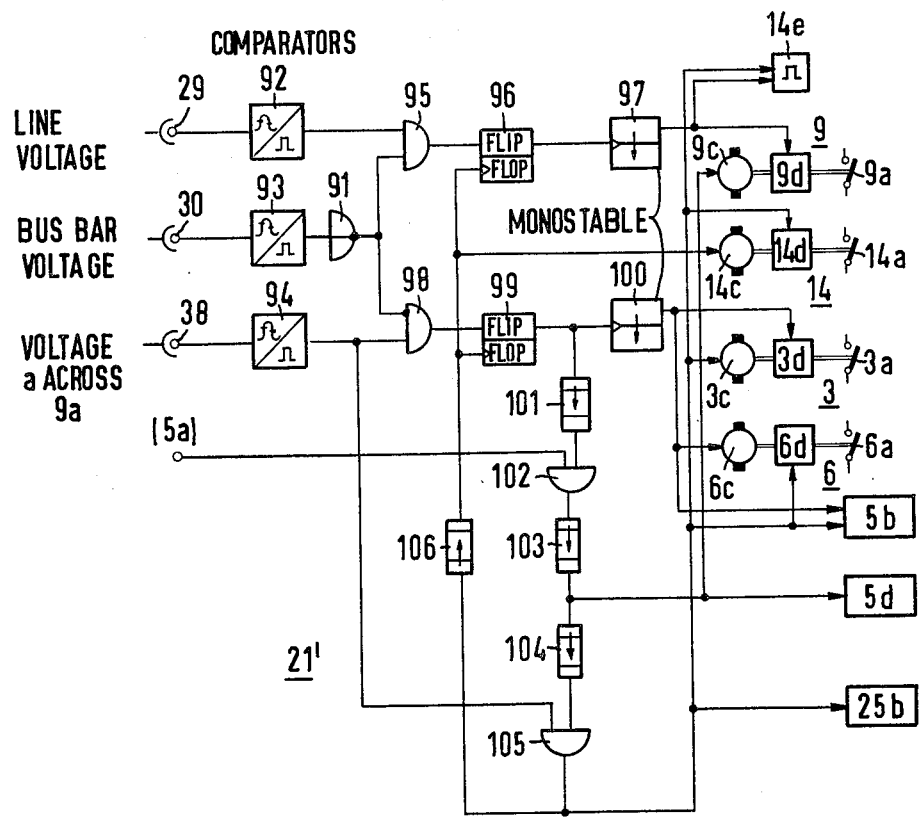
FIG. 6 is a circuit diagram of a second embodiment for the same purpose.

A control means 21' suitable for this purpose is shown on FIG. 6. Again, at the input of the control means are three comparators 92, 93 and 94. They are coupled respectively to the line voltage sensor 29, the bus bar voltage sensor 30 and a voltage sensor 38 for sensing the voltage across the contacts 9a in the output of filter 2. The comparators 92 and 93 provide a logical 1 signal output when the monitored voltage lies within predetermined tolerances. Should deviations beyond pre-established occur a logical 0 signal is provided. Comparator 94 generates a logical 1 signal when the voltage across the contacts 9a of the switching means 9 become 0.

When both the network voltage and bus bar voltage are at their correct values, an AND gate 95 will have a logical 1 signal at one input from the comparator 92 and a logical 0 signal at its other input obtained from an inverter 93a coupled to the output of comparator 93. Its output will thus be a logical 0. At this point the contacts 9a of the switching means are closed and semiconductor 9b is conductive, the switch means 14a are non-conductive with contacts 14a closed and semiconductor switch 14b disabled.

If the bus bar voltage deviates from its pre-established limits but the network remains at its proper level, the output of comparator 93 changes to a logical 0 which, when inverted through 93d appears, as a logical 1 at AND gate 95. It will now have a logical 1 output which will set a flipflop 96. The output of flipflop 96 is the input to a monostable multivibrator 97 which provides an output pulse to cause the release mechanism 9d to open the contact 9a. The output pulse is also provided to the pulse generator 14e associated with switch 14 to enable it to provide firing pulses to the semiconductor switch 14b. The bus bar now is connected to the a–c voltage supply network 4 bypassing the filter 2. Assuming the voltage deviation was the result of a short circuit there will now be a short circuit current with a steep current rise which will blow the fuses.

Once the fuses blow, the bus bar voltage will return to its nominal value. The output signal of the comparator 93 will again become a logical 1 which, after inversion, is a logical 0 at the input to gate 95. If there is no defect in filter 2, the output of the comparator 94 will be at a logical 1 indicating 0 voltage across contact 9a. The output of the comparator 94 is one input to an AND gate 98 which has an inverted input from the inverter 93a. Since the bus bar voltage is again normal, the output of comparator 93 is a logical 1 and the output of inverter 93 a logical 0. When inverted at the inverting input of gate 98 this appears as a logical 1 and gate 98 has a logical 1 output. This sets flipflop 99. The output of flipflop 99 fires a monostable multivibrator 100. Monostable multivibrator 100 has outputs which activate the release mechanism 3d associated with switch 3 to open the contacts 3a, activate the motor 6c to close the contacts 6a, and enable the enabling unit 5b of the inverter to permit firing pulses to reach the semiconductor controlled rectifiers therein. The inverter is now controlled to deliver a voltage and current.

The output of the flipflop 99 is also coupled to a delay 101 which provides its output to an AND gate 102 receiving a second input from the power section of the inverter 5 indicating that it is operating properly. If this is the case, the AND gate 102 provides and output at a logical 1 which is delayed through another delay means 103. The output of delay means 103 provides a control signal to the regulator 5d of the inverter causing it to deliver power to charge the filter elements in filter 2. In addition, this output is provided to the motor 9c causing the contact 9a to be closed. Since the filter 2 has already been charged by the inverter 5 through the switching means 6, an impermissibly high current surge does not occur when the contacts 9a of the switching means 9 are closed. The output of delay means 103 is also coupled through a further delay means 104 as one input to an AND gate 105 obtaining its second input from the output of the comparator 94. The output of AND gate 105 indicates that the voltage at the filter output has reached its nominal value and also indicates full power takeover by the inverter. This output is used to operate the release mechanism 14d to open the contact 14a and to disable the firing pulse generator 14e. In addition, it causes the motor 3c to close the contact 3a of the switching means 3 and causes the the semiconductor regulator 25 to be enabled to receive pulses in the manner described above. This output also stops the inverter by disabling the enabling means 5b causing it to go back into readiness operation, i.e. the firing pulse no longer reach the controlled rectifiers. The flipflops 96 and 97 are reset to their starting position by means of a pulse from a delay means 106 coupled to the output of AND gate 105. This output is also used to actuate the motor 16c to cause the closing of contacts 14a.

The two described methods of switching back from direct feeding of bus bar 10 through the switching means 14 to normal operation from the supply network 4 through the power transformer 24, semiconductor regulator 25 and filter 2, both have the characteristic that first the filter 2 is charged either by the supply network 4 or by the inverter 5 before its output is connected to the bus bar 10. It can be seen from the two switching methods described above that the switching means 9 and 14 can in principle be constructed in more simple fashion. In switching 9 the semiconductor switch 9b and its pulse generator 9e and in switching means 14 the mechanical switch contact 14a and its drive and release mechanisms 14c and 14d may be omitted. The essential thing is that by opening of the contacts 9a the filter output can be quickly separated from the bus bar 10 and that the latter can be connected to the supply network 4 very quickly by the actuation of semiconductor switch 14b so that a short circuit current with a steep current rise can form in the defective load or filter blowing the fuse. In switching back, rapid switching is in principle not necessary. However, the switching sequences for the charging of the filter 2 and subsequent connecting of filter 2 to the bus bar 10 should be well coordinated to prevent formation of impermissably high circular currents from the supply network through filter 2, the bus bar 10 and back to network 4. The semiconductor switch 9 and mechanical switch including elements 14a, 14c and 14d can, however, be used to advantage for protective functions. The same is true of switching means 6. It should be noted that the described switching to direct network feeding and switching back after filter 2 has been charged is also of importance when dispensing with the power transformer 24 and/or the semiconductor regulator 25 because no conditioning of the network voltage is to be provided in normal operation. In such a case, the method of switching back in which the filter is charged by the inverter will be used.

Another special advantage of the interruption free current supply system of the present invention resides in the fact that during normal operation the charging of the storage means 7, e.g. a battery can take place with good efficiency and low additional circuit cost. Since in normal operation the controlled rectifiers of the power section 5a are not energized with firing pulses, a charging means can be obtained which uses the static converter transformer 8, a rectifier circuit and means for adjustment of the charging current during charging operation. In normal operation the network side winding of the static converter transformer 8 is connected to the a–c voltage supply network through the closed contact 6a of the switching means 6, through the closed contacts 3a of the switching means 3 and through the semiconductor regulator 25 along with power transformer 24. This eliminates the need for a special transformer for use in a charger.

To charge the storage battery 7 in normal operation to full voltage, it would be necessary to apply at the winding on the network side of the static converter transformer 8 a higher voltage than that generated by the inverter 5 in an emergency power operation. Such a high a–c voltage, however, is not available during normal operation. Thus, the storage battery 7 can be made up of two sectional batteries connected in parallel during normal operation and in series for emergency power operation. Alternatively, the inverter transformer can have additional windings on the static converter side. In both cases charging of the storage battery to its full voltage with the usual voltage of the a–c voltage supply network 4 becomes possible. Charging can be done in a particularly advantageous manner when the inverter 5 is designed as a parallel inverter. A parallel inverter has bridge branches with main current rectifiers and bridge branches with return rectifiers connected with opposite polarity. The centers of the bridge branches for the return current rectifiers are located respectively at the end terminals or at the taps of the winding of the static converter transformer on the converter side. For charging operation, the rectifier circuit made up of the return rectifiers can be used to recharge the storage battery. This greatly reduced the cost of the rectifiers needed. When, for example, in a parallel inverter, return current diodes are used as the return current rectifiers, they form an uncontrolled rectifier circuit. However, another possibility is to use control rectifiers, particularly thyristors as the return rectifiers in a parallel inverter. In emergency power operation these controlled rectifiers are continuously actuated with firing pulses. In the charging operation the controlled return rectifiers can be actuated as in a controlled rectifier circuit with a gating control or pulse control. In the charging operation the ignition angle of the firing pulses for the control return rectifiers can be determined in particular by by a charge regulating means to provide any desired by a charging characteristic.

Figure 7:
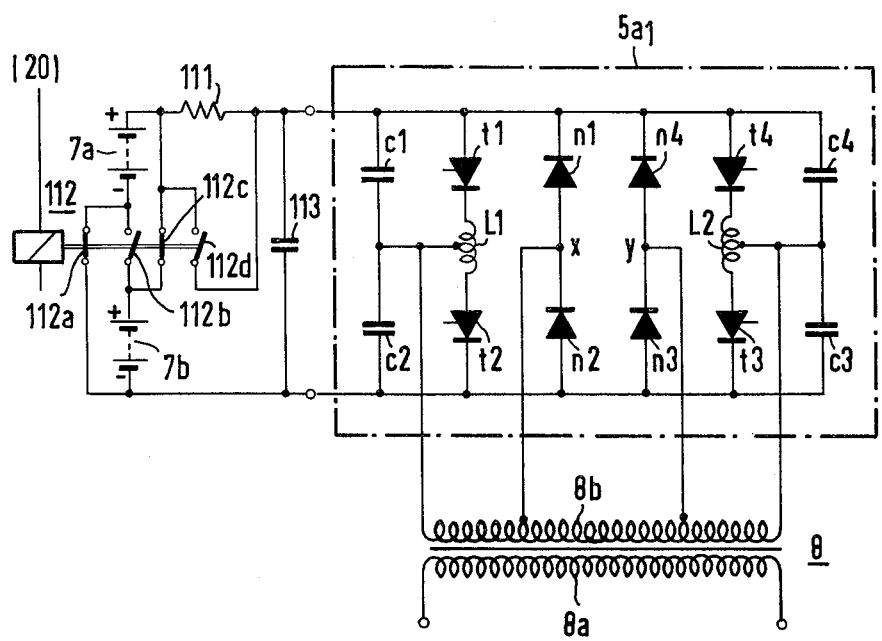
FIG. 7 is a circuit diagram illustrating a first charging circuit which can be used with the system of the present invention.

FIG. 7 illustrates in detail a transformer 8 and parallel inverter $5a_1$ which can be used as the power section of the inverter 5a of FIG. 1. The transfomer 8 includes a winding 8a on the network side and a winding 8b on the inverter side. The power section $5a_1$ of the inverter is constructed as a parallel inverter having a pair of d–c storage batteries 7a and 7b connected to its input.

The parallel inverter $5a_1$ includes two main current bridge branches having main rectifiers t1, t2 and t3, t4. In addition, there are two bridge branches with return current diodes n1, n2 and n3, n4 having polarity opposite to that of the main controlled rectifiers. The capacitors c1 through c4 and the coils L1 and L2 form commutation circuits for the main controlled rectifiers t1 through t4 in conventional fashion. The output voltage of the inverter $5a_1$ is tapped at the center taps of the coils L1 and L2. The centers x and y of the two bridge branches containing the return current diodes n1, n2 and n3, n4 are connected to taps of the winding 8b on the converter side of the static converter transformer 8. At the d.c. input of the parallel inverter $5a_1$, a storage battery composed of two sections 7a and 7b is connected. A charging resistor 111 is connected in series with the batteries. A contactor 112 is provided having contacts 112a through 112d wired in the manner illustrated on the drawing. A smoothing capacitor 113 is also provided across the input to absorb current peaks.

With the contacts 112a through 112d of the contactor 112 as shown in FIG. 7, charging operation, i.e. normal operation, in which the winding 8a on the network side of the static converter transformer is coupled to the a–c voltage supply network 4 through closed the contact 6a is illustrated. The voltage applied to the winding 8a is coupled through the transformer to the winding 8b and then to the center points x and y in the bridge branches containing the return current diodes n1, n2 and n3, n4. Thus, the center points x and y form the a–c voltage input of a rectifier circuit comprising the return current diode n1–n4 which is connected through the closed contacts 112a to the battery sections 7a and 7b. Battery 7b has its cathode connected directly to the negative bridge output. Its anode is coupled through the switch 112c to the positive output of the bridge. Similarly, the battery 7a has its anode coupled through the resistor 111 directly to the positive bridge output and its cathode through the switch contact 112a to the negative bridge output. In this arrangement, both batteries are charged with a charging current determined by the magnitude of the charging resistor 111.

Figure 7A:
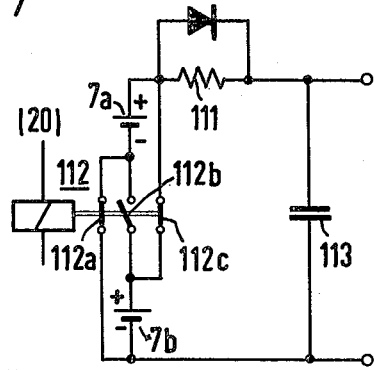
FIG. 7a is a circuit illustrating the use of a diode across resistor III.

When changing over from a charging operation to emergency operation and hence to inverter operation, control means are used to operate the contactor 112 to open the contacts 112a and 112c and closed the contacts 112b and 112d. The charging resistor 111 is now shunted by the contact 112d. Alternatively, a diode may be placed across the resistor 111 as shown on FIG. 7a and contact 112d eliminated. The two battery sections 7a and 7b are connected in series so that their voltage adds. The converter then operates in conventional fashion with discharge current flowing from the storage battery through the main control rectifiers t1 through t4 and the converter transformer 8 to supply the load.

With the embodiment illustrated in FIG. 7, the need for a separate charging transformer and separate charging rectifier are eliminated. Furthermore, when switching from normal operation, i.e. charging operation to emergency power operation of the inverter, the static converter transformer 8 is already in a magnitized state. As a result, the transformer 8 need not be designed for current surge when switching on.

Figure 8:
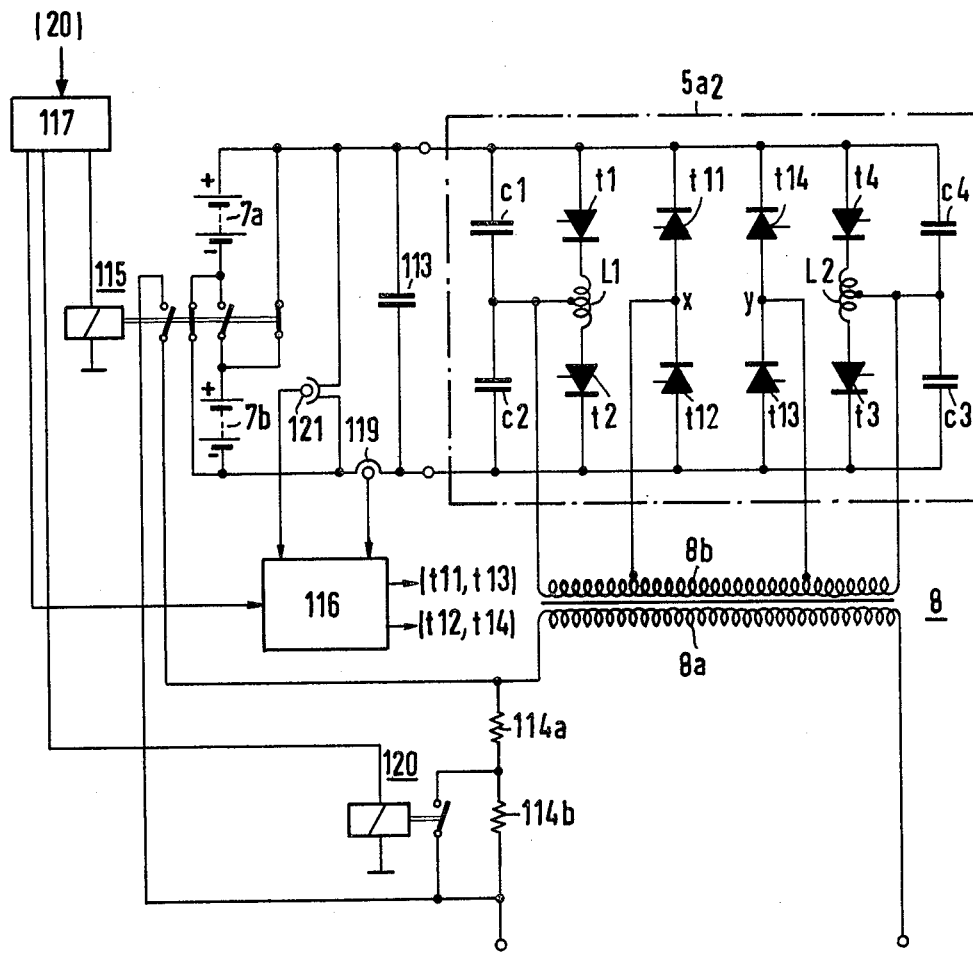
FIG. 8 is a circuit diagram of a second embodiment of a charging circuit for the present invention.

An alternate form of construction for the charging circuit with a parallel inverter is illustrated on FIG. 8. Once again, a battery made up of sections 7a and 7b is provided. The wiring of the parallel inverter $5a_2$ is similar to that of FIG. 7 except that controlled rectifiers t1 through t4 which provide for return current replace the return. For the purpose of controlling the charging operation, a pair of series connected resistors 114a and 114b are placed in series with the winding 8a. The resistor 114a is shunted by the contact of a contactor 120. Through this connection of the resistors in series, lossed due to noise in the static converter transformer during the charging operation are reduced.

When the contact of relay 120 is in the position shown, i.e. when it is opened, the resulting charging resistance is the sum of the two resistances 114a and 114b. The sum of the two charging resistances is selected so that the resulting charging current is a trickle charge. When contact of relay 120 is closed, the charging resistor 114b is shunted. Only the charging resistor 114a is still active. It is rated to provide a normal charging current for both sectional storage batteries. By means of the two charging resistors 114a and 114b wired in the illustrated manner, it is possible to charge the batteries with a normal charge or with a trickle charge.

In order to be able to obtain any desired charging characteristic, the return current rectifiers of the parallel inverter $5a_2$ are controlled rectifiers of noted above. These will preferably be thyristors and are controlled by firing pulses obtained from a control pulse generator 116. During the charging operation the thyristors $t11$ and $t14$ function like a controlled rectifier circuit and are correspondingly actuated by firing pluses. At the input to the control means 116 is the voltage across the parallel connection of the sectional storage batteries 7a and 7b. This is obtained from a voltage sensor 121. Also at the input is the charging current as measured by a current sensor 119. From these measured values any desired charging characteristic can be obtained. During emergency power operation, i.e. inverter operation, the thyristors T11 to T14 are made to be continuously conductive. Switching from charging operation to inverter operation occurs by means of a contactor 115 whose contacts are wired in a manner similar to the contacts 112 of FIG. 7.

In order to control the contactor 115 and the control means 116 for the thyristors T11 to T14 and control the relay 120, an operation control device 117 is provided. This device controls the switching from charging operation to inverter operation and back to charging operation and determines whether normal or trickle charge is required. In other words, the contactor 115 and relay 120 are controlled accordingly and the necessary switching procedures carried out and the necessary switching procedures carried out in the control means 116. The operation control device 117 may be integrated into the overall control means 20. Through the use of return current rectifiers $t11$ through $t14$ and their associated control means 116, it is possible, in principle, to adjust any desired charging current without the need for any charging resistors. However, since the normal charging current is considerably smaller than the discharging current in most cases, and since the current for a trickle charge is in turn much smaller than the normal charging current, the charging resistors 114a and 114b are desirable so that, during charging operation, the ignition angles for the firing pulses of the thyristors $t11$ to $t14$ need not excessively small.

Figure 9:
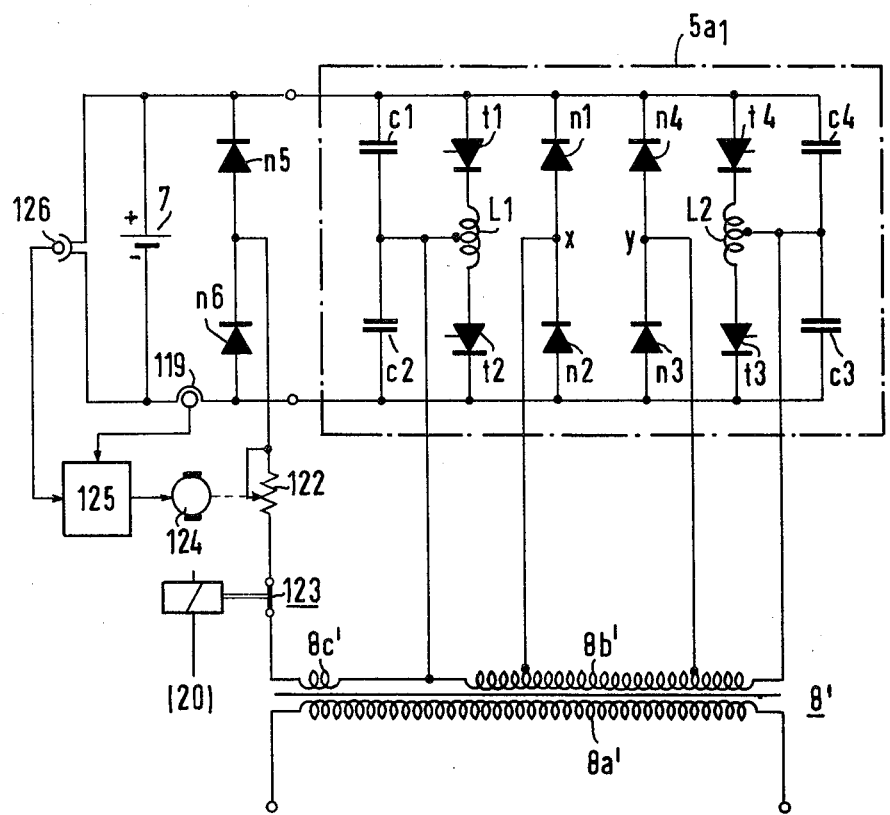
FIG. 9 is a circuit diagram of a third embodiment of a charging circuit for the present invention.

A further embodiment of a charging device is illustrated in FIG. 9. In this embodiment the parallel inverter $5a_1$ described in connection with 7 is again used. However, the transformer 8' now contains a winding 8a' on the network side and windings 8b' and 8c' on the converter side of the transformer. In the illustrated embodiment, two additional diodes n5 and n6 forming an additional bridge branch are provided. The center u of this branch is connected to the outer terminal of additional transformer winding 8c. The connection is through an adjusting resistor 122, which is the charging resistor, and through the contact of a relay 123. The tap of the charging resistor 122 is displaceable by a motor 124 controlled by control means 125. At its input, the control means 125 has measured values of the charging current and the voltage of the storage battery 7 picked up by a current sensor 119 and voltage sensor 126. These inputs are used in a conventional servo-motor control, i.e. control means 125, to cause the motor to position the wiper on the resistor 122 to give the desired charging current.

In normal charging operation the contact of relay 123 is in the position shown, i.e. it is closed. The winding 8a' on the network side of the static converter transformer 8' is connected to the a-c supply network through the closed contact 6a of FIG. 1. The rectifier which is used for providing the charging voltage and current is the bridge circuit has as one branch the diodes n3 and n4 and as its other branch the diodes n5 and n6. Feeding of the a-c voltage to the bridge occurs at points u and y. The effective voltage at these points is the sum of the voltages developed at the windings 8c' and 8b'. This is a voltage sufficiently high to provide for charging. In other words, it is only necessary to give the additional winding 8c suitable dimensions to provide sufficient charging of the battery 7 to full voltage. As noted, the adjusting resistor 122 is set by the control means 125 according to predetermined charging characteristics so that the necessary and desired charge may be maintained. In other words, it can be adjusted for a heavy charge, a normal charge or a trickle.

When switching from normal charging operation to emergency power operation, during which time the inverter will be operating, relay 123 is activated and its contact opened. As a result the additional winding 8c' and adjusting resistor 122 are thus disconnected.

The embodiment of FIG. 9 may be modified by providing controlled rectifiers such as thyristors in place of the diodes n5 and n6. In such a case the rectifier circuit will then contain the return current diodes n3 and n 4 and the controlled rectifiers in place of the diodes n5 and n6. Such a circuit constitutes a semicontrolled bridge circuit and permits adjusting the charging current by respective actuation of the controlled rectifiers of this bridge. In such a case a fixed resistor, which may be shunted, can be used to replace the resistor 122.

It is also possible to modify the circuit of FIG. 9 such that controlled rectifiers are used in place of diodes n5, n6 and n3 and n4. The rectifier circuit will correspond to a fully controlled bridge. Operation of such will be essentially the same as described in connection with FIG. 8.

Figure 10:
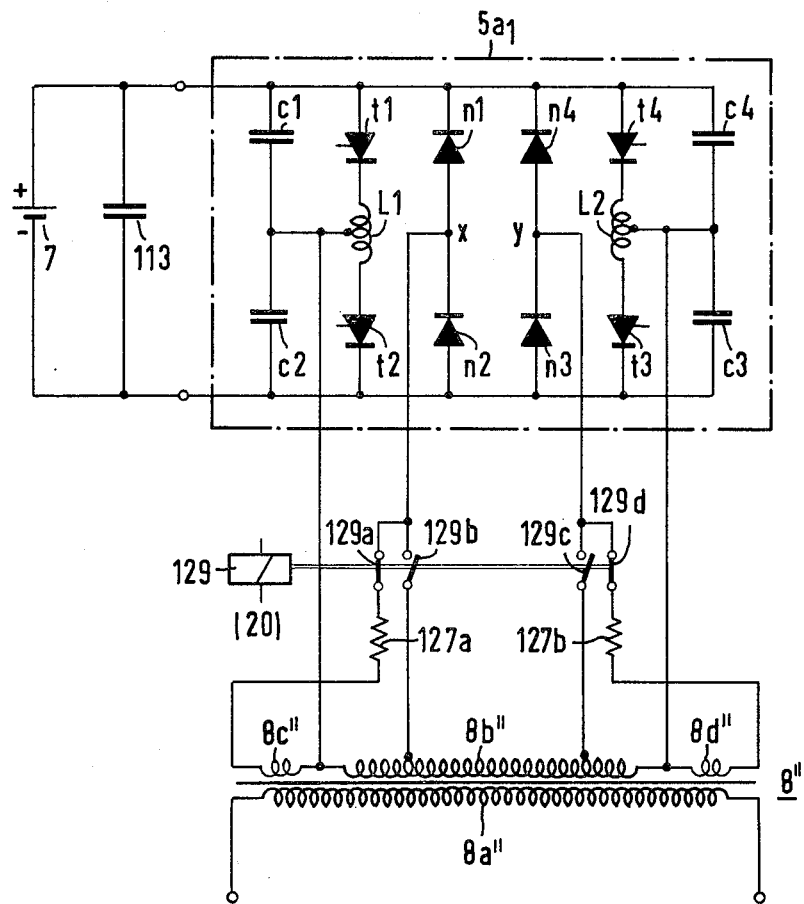
FIG. 10 is a circuit diagram of a fourth embodiment of a charging circuit for the present invention.

A further embodiment for a charging circuit is shown on FIG. 10. Once again the parallel inverter $5a_1$ is the same as in FIG. 7. However, in this embodiment the transformer 8'' comprises a winding 8a'' coupled to the network and windings 8b'', 8c'' and 8d'' on the converter side. In other words, in addition to the normal winding 8b'', additional windings 8c'' and 8d'' are provided one on each side in series with the main winding. The centers x and y of the bridge branches containing the return current diodes n1 through n4 in this embodiment are coupled through the contacts 129a or 129b and 129d or 129c, either to the winding 8b'' or through respective charging resistors 127a and 127b to the outside ends of the windings 8''c and 8''d. In the position shown, they are connected through the charging resistors and the contacts 129a and 129d to provide the increased voltage necessary for charging the battery 7'. When the switching from normal charging operation to emergency power operation the contacts of relay of 129 are reversed thereby opening the contacts 129a and 129d and closing the contacts 129b and 129c. The windings 8c'' and 8d'' and the charging resistors 127a and 27b are thus removed from the circuit. Now the points x and y are connected to the taps on the windings 8b'' corresponding to the winding 8b described in connection with FIG. 7.

The charging resistors 127a and 127d of FIG. 10 permit a symmetrical load on the static converter transformer during charging operation. In principle, however, it is possible to eliminate one of these two charging resistors and to dimension the remaining charging resistor accordingly. Also, a single charging resistor may be placed in series with the winding 8a'' on the network side. In such a case this resistor will be bridged by a switch for inverter operation. Finally, one single charging resistor may be provided in series with the storage battery, the single resistor shunted by a switch or by a diode poled in the flow direction of the discharge.

It is also possible to modify the embodiment of FIG. 10 to replace the return current diodes n1 to n4 with controlled rectifiers to provide a fully controlled rectifier bridge. In such a case, control would be in the same manner described in connection with FIG. 8.

Figure 11:
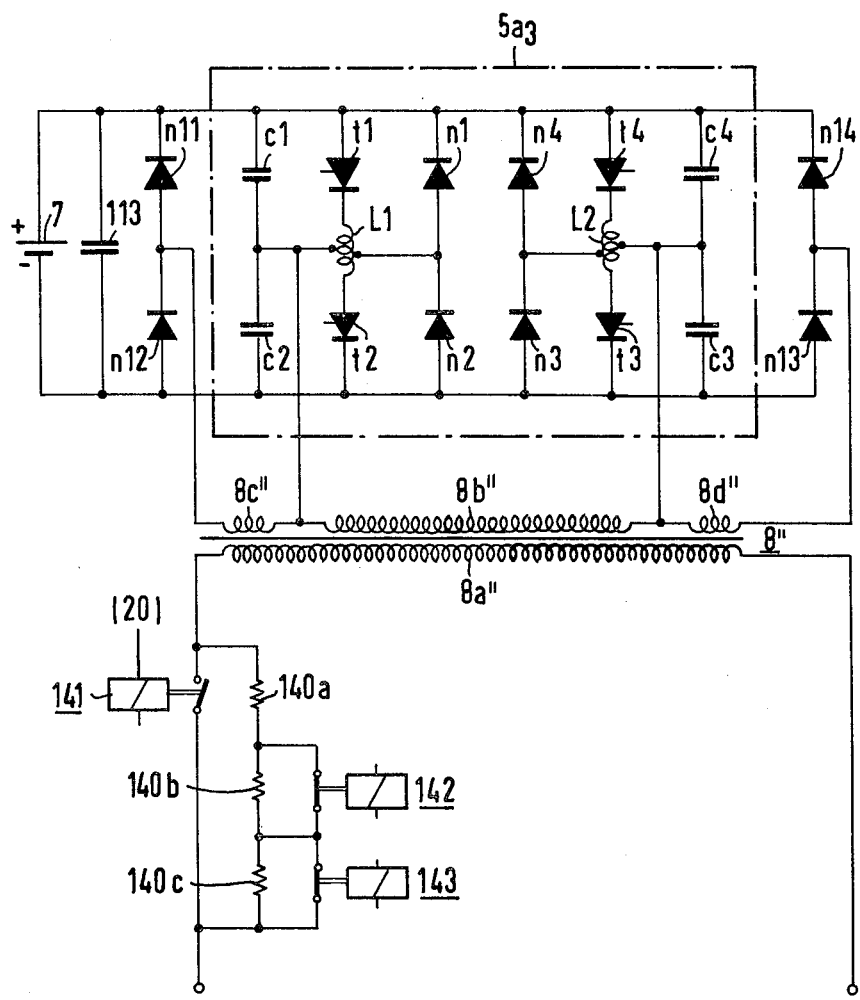
FIG. 11 is a circuit diagram of a fifth embodiment of a charging circuit for the present invention.

A further embodiment of a charging circuit is illustrated by FIG. 11. This embodiment utilizes a transformer identical to that of FIG. 10. However, the power portion of the inverter, designated $5a_3$ differs in that the points x and y are no longer connected back to taps on the transformer winding but are instead coupled to taps on the coils L1 and L2. Otherwise, the converter is the same as that described in connection with FIGS. 7 and 10. This connection in effect causes the points x and y to be connected to the ends of the transformer winding 8b''.

The circuit of FIG. 11 includes an additional rectifier bridge made up of the bridge branches containing diodes n11 and n12 and n14 and n13. The center points of these bridge branches, v and u, are coupled respectively to the outer ends of the windings 8c'' and 8d'''. These additional diodes n11 through n14 form an additional rectifier for charging storage battery.

In this embodiment the charging resistors are provided on the network side of the transformer. Shown are three series resistors 140a, 140b and 140c. The series resistors are shunted by the contact of relay 141 so that they may be bypassed during converter operation. Furthermore, the resistor 140b is shunted by the contact of a relay 142 and the resistor 140c by the contact of a relay 143. This permits placing one, two or all three of the resistors in the circuit to control the charging current. During normal charging operation the contact of relay 141 is opened. With the contacts of relays 142 and 143 closed, only the resistor 140a is in the circuit as a charging resistance. This results in a heavy charge. When the contact of relay 142 is opened, both resistors 140a and 140b are in the circuit and the charging current for a normal charge results. If the contact of the relay 143 is also opened, all three resistors are in the circuit and the summed resistance results in only a trickle charge.

The advantage of the embodiment of FIG. 11 is that the circuit is suitable for any desired static converter. The static converter circuit need not be changed in any way because additional diodes are used for the rectifier circuit. Compared with the use of a separate charger this embodiment still gives the advantage of not needing a separate transformer. The economy involved has a favorable effect on the total cost and the space requirements of the system.

If a regulated charging of the storage battery 7 in accordance with a given characteristic is required, the additional diodes n11 through n14 may be replaced with controlled rectifiers such as thyristors along with an appropriate control means such as that disclosed in connection with FIG. 8. It is also possible to modify this circuit to place the charging resistors on the converter side of the transformer. The charging resistors in each of FIGS. 7–11 need not be simple ohmic resistors but may be controlled semiconductors such as triacs.

In the embodiments just described, in order to ease the understanding of the invention, contacts, in the form of mechanical contacts such as relay contacts have been described. It will be recognized by those skilled in the art that such relay contacts may be replaced in conventional fashion by electronic switches such as thyristors or transistors.

It should further be noted that not only may storage batteries be used as energy accumulators but that capacitors may also be used. In some cases the inverter will only be in operation for a short time. Such a case exists where it only operates until an emergency diesel generator has been started. In such case, capacitors are quite practical energy accumulators.

In conjunction with the present invention, inverter circuits of a simple construction have been described. The invention is not limited to such circuits and in particular may be used with three phase inverters and the like. These and other modifications may be made without departing from the spirit of the invention which is intended to be limited solely by the appended claims.

I claim:

1. An interruption free current supply system for use with an a–c voltage supply network supplying a load comprising:
    a. an inverter having:
        1. a d.c. storage means;
        2. a regulating unit;
        3. a drive unit for generating firing pulses;
        4. a power section containing controlled rectifiers receiving their d.c. input from said storage means and their firing pulses from said drive unit and providing their output through an inverter transformer;
    b. enabling means coupled between said drive unit and the control rectifiers in said power section for blocking the transfer of firing pulses from the drive unit to the controlled rectifiers during normal operation and enabling said firing pulses to reach said controlled rectifiers during emergency power operation;
    c. a filter having its output connected to the load;
    d. first switching means for coupling the a–c voltage supply network to said filter for normal operation;
    e. second switching means for coupling the output of said inverter to said filter for emergency power operations; and
    f. control means for controlling said enabling means, first and second switching means.

2. Apparatus according to claim 1 and further including, between said voltage supply network and said first switching means: a network transformer; and a semiconductor regulator comprising:
    a. controlled semiconductor setting means including controlled semiconductors;
    b. a drive unit generating firing pulses for said controlled semiconductor setting means; and
    c. regulating means providing a control input to said drive unit.

3. Apparatus according to claim 2 and further including a disabling unit between said semiconductor regulator drive unit and said semiconductor setting means for blocking the transfer of firing pulses from said drive unit to the controlled rectifiers in said semiconductor setting member, said drive unit being energized both during normal and emergency power operation; and means for supplying a control voltage to said drive unit even during emergency power operation.

4. Apparatus according to claim 3 wherein said means for supplying a control voltage to said drive unit comprises a drive computer having as an output a computed control voltage, and means to supply said output to said drive unit at least prior to switching back to normal power operation from emergency power operation.

5. Apparatus according to claim 1 and further including:
   a. third switching means between the output of said filter and said load;
   b. fourth switch means between said a-c voltage supply network and said load;
   c. first means for sensing the network voltage;
   d. means for sensing the voltage at load; and
   e. control means having as inputs the outputs of said first and second means for sensing, for controlling said third and fourth switches so as to open said third switch and close said fourth switch if the load voltage deviates beyond a predetermined limit while the network voltage remains within prescribed limits.

6. Apparatus according to claim 5 wherein said control means further includes means for, upon sensing of the restoration of the correct load voltage and simultaneously correct network, opening said first switching means to separate the filter input from the network; starting said inverter; closing said second switching means to connect said inverter to the input of said inverter; and, after takeover of the load power by the inverter, means for separating the load from the network by opening said fourth switching means and connecting said load to said filter by closing said third switching means; and for then closing said first switching means and controlling said inverter to no-load operation and stopping it.

7. Apparatus according to claim 5 and further including, between said voltage supply network and said first switching means, a network transformer; and a semiconductor regulator comprising:
   a. controlled semiconductor setting means including controlled semiconductors;
   b. a drive unit generating firing pulses for said controlled semiconductor setting means; and
   c. regulating means providing a control input to said drive unit.

8. Apparatus according to claim 7 wherein said control means further includes means, upon restoration of the correct load voltage and simultaneously correct network voltage, to:
   a. enable said semiconductor regulator for conduction;
   b. close said third switching means and open said fourth switching means.

9. Apparatus according to claim 5 and further including means to monitor the voltage at the output of said filter, said means providing an input to said control means.

10. Apparatus according to claim 1 wherein at least one of said switching means comprises the series connection of a mechanical switch, having a contact, a release mechanism and motor driven closing mechanism, and a semiconductor switch and control means responsive to a command to switch off to open the contacts of said mechanical isolating switch and make the semiconductor switch non-conducting, after occurrence of a currentless or voltageless state, to cause the contacts of the mechanical isolating switch to close again, and, upon a command to switch on, to make said semiconductor switch conductive.

11. Apparatus according to claim 10 wherein said first switching means comprises a mechanical switch having coupled in series therewith a semiconductor regulator providing the function of a semiconductor switch, said second switching means comprises a mechanical switch with the controlled rectifiers of said inverter serving as a semiconductor switch in series therewith and wherein said switching control logic comprises means for, when a switching command from normal to emergency is given,
   1. opening said first mechanical switch;
   2. rendering said semiconductor regulator non-conductive and starting said inverter; and
   3. closing said contacts of said first mechanical isolating switch after complete current takeover; upon receiving a switch command from emergency power operation to normal operation for:
   4. stopping said inverter;
   5. opening the mechanical contacts of said second second switching means;
   6. making said semiconductor regulator conductive; and, after complete current takeover for;
   7. closing the contacts of said second switching means.

12. Apparatus according to claim 1 and further including charging means for charging said d.c. storage means said charging means comprising:
   a. the inverter transformer;
   b. a rectifier circuit;
   c. and means for adjusting the charging current.

13. Apparatus according to claim 12 wherein said d.c. storage means is comprised of two partial voltage storage means and further including fifth switching means for coupling said two partial sources in parallel for charging and in series for discharging.

14. Apparatus according to claim 12 wherein said static converter transformer is provided with at least one additional winding on the converter side with the outer terminal of said addditional winding coupled to the a—c voltage feed point of said rectifier circuit.

15. Apparatus according to claim 12 wherein said inverter is a parallel inverter having bridge branches containing controlled main rectifiers and bridge branches with return rectifiers having a polarity opposite to that of said main rectifiers, the centers of the bridge branches containing said return rectifiers being coupled to two sides of the winding on the converter side of said converter transformer, said rectifier circuit being made up of said return current rectifiers.

16. Apparatus according to claim 15 wherein said return rectifiers comprise controlled rectifiers and further including means to control said rectifiers for continuous operation during discharge and for providing firing pulses thereto in a response to a control input during charging operation; means for measuring the state of charge of said chargeable d.c. voltage source;

and charge regulating means having the output of said measuring means as an input and providing a control input to said means providing firing pulses.

17. Apparatus according to claim 15 wherein said rectifier circuit comprises a bridge rectifier having one bridge branch made up of two of said return rectifiers and two additional rectifiers forming a second bridge branch.

18. Apparatus according to claim 17 wherein said additional rectifiers are controlled rectifiers and further including means to make said rectifiers non-conductive during static converter discharging operation and to provide firing pulses to said rectifiers during charging; means for measuring the state of charge of said chargeable d.c. voltage source; and regulating means having the output of said measuring means as an input and providing a control input to said means providing firing pulses.

19. Apparatus according to claim 12 wherein said means for adjusting the charging current comprises a charging resistance.

20. Apparatus according to claim 19 wherein said charging resistor is coupled in series with said d.c. storage means and further including means for shunting said resistor during the discharge of said d.c. storage means.

21. Apparatus according to claim 15 wherein said means for adjusting charging current is a charging resistor coupled between the center of a bridge branch containing said return rectifiers and the respective terminal at the transformer winding on the converter side and further including means for shunting said resistor.

22. Apparatus according to claim 15 wherein said means for adjusting charging current is a charging resistor coupled in each line between a bridge center of the bridge branches with return rectifiers and the corresponding terminals of the converter winding on the converter side of the converter verter transformer and further including means for shunting said resistors.

23. Apparatus according to claim 19 wherein at least one charging resistor coupled in series with the winding of said static converter transformer on the network side and means for shunting said charging resistor.

24. Apparatus according to claim 19 wherein said charging resistance comprises the series connection of a first resistor sized to provide normal charging current and a second resistor which when added to said first resistor will result in a trickle charge and means for shunting said second resistor.

25. Apparatus according to claim 19 wherein said charging resistors comprises the series connection of first, second and third resistors the sum of said three resistors resulting in a trickle charge, the sum of said first and second resistors resulting in a normal charge and said first resistor resulting in a heavy charge and means for individually shunting said second and third resistors.

26. Apparatus according to claim 19 wherein said charging resistor comprises a variable resistor, and further including means to measure the state of charge of said chargeable of said d.c. voltage source and means having the output of said measuring means as an input and coupled to control said variable resistance.

27. Apparatus according to claim 11 wherein said means for the adjustment of charging current comprises a controllable semiconductor.

28. A method of operating an interruption-free current supply which includes:

a. an inverter having:
  1. a d.c. storage means
  2. a regulating unit;
  3. a drive unit for generating firing pulses;
  4. a power section containing controlled rectifiers receiving their d.c. input from said storage means and their firing pulses form said drive unit and providing their output through an inverter transformer;
b. enabling means coupling between said drive unit and the control rectifiers in said power section for blocking the transfer of firing pulses from the drive unit to the controlled rectifiers during normal operation and enabling said firing pulses to reach said controlled rectifiers during emergency power operation;
c. a filter having its output connected to the load;
d. first switching means for coupling the a–c voltage supply network to said filter for normal operation;
e. second switching means for coupling the output of said inverter to said filter for emergency power operations; and
f. control means for controlling said enabling means, first and second switching means;
g. a network transformer and a semiconductor regulator between said voltage supply network and said first switching means said semiconductor regulator comprising:
  1. controlled semiconductor setting means including controlled semiconductors;
  2. a drive unit generating firing pulses for said controlled semiconductor setting means; and
  3. regulating means providing a control input to said drive unit;
  4. a disabling unit between said drive unit and said setting means, comprising the steps of:
a. in normal operation feeding the load from the a.c. voltage supply network through the power transformer and voltage regulated semiconductor regulator, said first switching means and said filter;
b. regulating fluctuations of the a.c. voltage supply network with said voltage regulated semiregulator in conjunction with said power transformer
c. upon sensing a complete failure of severe collapse of voltage of the supply network, opening and first switching means and closing said second switching means to couple said filter to said inverter and enabling said inverter firing pulses to reach its controlled rectifiers;
d. upon return of sufficient voltage in the a.c. voltage supply unit, synchronizing the drive unit of said semiconductor regulator with a.c. voltage supply network and presetting the ignition angle for firing pulses in said semiconductor regulator; and
e. stopping said inverter and opening said second switching means and closing said first switching means to connect said filter to the a.c. network and enabling said semiconductor regulator to be brought to the conductive state with said preset ignition angle.

29. The method of claim 28 and further including the step of sensing an impermissable deviation of the load voltage and simultaneous correct network voltage and thereupon disconnecting the load from said filter output and coupling said load directly to said a.c. voltage supply network.

30. The method according to claim 29 and further including:

a. upon sensing a correct load voltage and simultaneous correct a.c. supply voltage disconnecting the input of said filter from the a.c. voltage supply network and starting said inverter;
b. coupling said inverter to the input of said filter and controlling said inverter so that the voltage difference between the output of said filter and said load voltage becomes zero;
c. coupling the output of said filter to said load;
d. controlling said inverter to take over the power supply of said load;
e. when said inverter has taken over said load, opening the direct connection of said a.c. supply network and said load;
f. controlling said semiconductor regulator with a preset ignition angle and coupling it to the input of said filter while controlling said inverter to no load operation.

31. The method according to claim 29 and further including:

a. upon sensing the restoration of a correct load voltage and simultaneously correct a.c. voltage network voltage controlling said semiconductor regulator to make the voltage at the output of said filter equal to said load voltage and coupling the output of said semiconductor regulator to said filter input;
b. coupling the output of said filter to said load and controlling said semiconductor regulator to take over the load power through action on its regulating unit; and
c. disconnecting the direct connection of said a.c. voltage supply network and said load.

32. The method according to claim 28 wherein said inverter has associated with its transformer a rectifier circuit and means to control charging of said d.c. storage means and further including the step of charging the d.c. storage means by closing said second switching means and providing an input to the inverter through the converter transformer and rectifier bridge during normal operation.

* * * * *